US008525723B2

(12) United States Patent
Orr et al.

(10) Patent No.: US 8,525,723 B2
(45) Date of Patent: Sep. 3, 2013

(54) RADAR DETECTOR WITH NAVIGATION FUNCTION

(75) Inventors: Steven K. Orr, Cincinnati, OH (US); Timothy A. Coomer, West Chester, OH (US); John Kuhn, Sharonville, OH (US); Kevin L. Kipper, Liberty Township, OH (US)

(73) Assignee: Escort Inc., West Chester, OH (US)

( * ) Notice: Subject to any disclaimer, the term of this patent is extended or adjusted under 35 U.S.C. 154(b) by 183 days.

(21) Appl. No.: 12/915,835

(22) Filed: Oct. 29, 2010

(65) Prior Publication Data

US 2011/0102232 A1 May 5, 2011

Related U.S. Application Data

(63) Continuation-in-part of application No. 12/195,147, filed on Aug. 20, 2008, now Pat. No. 7,999,721.

(60) Provisional application No. 60/956,847, filed on Aug. 20, 2007, provisional application No. 60/984,167, filed on Oct. 31, 2007.

(51) Int. Cl.
*G01S 7/40* (2006.01)
*H04B 1/08* (2006.01)
*G01S 7/00* (2006.01)
*H04B 1/00* (2006.01)

(52) U.S. Cl.
USPC ........... 342/20; 342/13; 345/7; 340/815.4; 340/901; 73/178 R; 701/400

(58) Field of Classification Search
USPC ............. 342/13–20, 82, 89, 90, 165–175, 342/195, 350, 352, 357.2, 357.39, 450–465; 345/7, 8, 9, 156, 168, 169; 701/400, 408, 701/467; 248/200, 205.1, 205.5, 206.3, 214, 248/226.11, 231.51, 466, 475.1; 340/425.5, 340/463, 815.4, 901, 902, 903; 296/1.01, 296/37.1, 37.7; 73/178 R; 361/600, 825; 224/400, 309, 311, 312
See application file for complete search history.

(56) References Cited

U.S. PATENT DOCUMENTS 3,574,283 A * 4/1971 Albers .................. 73/178 R
3,793,635 A 2/1974 Potter
(Continued)

FOREIGN PATENT DOCUMENTS

JP 9-027096 A 1/1997
WO 97/08839 A2 3/1997
WO 00/29869 A1 5/2000

OTHER PUBLICATIONS

Listing "Cobra XRS 9965 15 Band Radar and Laser Detector: Car Electronics" amazon.com, accessed on Oct. 5, 2012; first-available-on-amazon.com date of Sep. 14, 2004.*

(Continued)

*Primary Examiner* — Bernarr Gregory
(74) *Attorney, Agent, or Firm* — Wood, Herron & Evans, LLP

(57) ABSTRACT

A GPS enabled radar detector incorporated in a general purpose navigation device dynamically handles radar sources based upon previously-stored geographically-referenced information on such sources and data from the GPS receiver. The detector may ignore detections received in an area known to contain a stationary source, or may only ignore specific frequencies or may handle frequencies differently based upon historic trends of spurious police radar signals at each frequency. Notification of the driver may take a variety of forms depending on the stored information, current operating modes, and vehicle speed. The device includes navigational functions as well. In one embodiment, the detector uses a transparent touch screen and a readily aligned mounting.

19 Claims, 26 Drawing Sheets

(56) References Cited

U.S. PATENT DOCUMENTS

| | | | |
|---|---|---|---|
| 4,025,920 A | | 5/1977 | Reitboeck et al. |
| 4,492,952 A | | 1/1985 | Miller |
| 4,539,642 A | | 9/1985 | Mizuno et al. |
| 4,581,769 A | | 4/1986 | Grimsley et al. |
| 4,631,542 A | | 12/1986 | Grimsley |
| 4,684,164 A | * | 8/1987 | Durham ............... 296/37.7 |
| 4,760,497 A | * | 7/1988 | Roston ............... 361/825 |
| 4,876,527 A | | 10/1989 | Oka et al. |
| RE33,112 E | * | 11/1989 | Durham ............... 296/37.7 |
| 4,887,753 A | * | 12/1989 | Allen ............... 224/312 |
| 4,896,855 A | * | 1/1990 | Furnish ............... 248/206.3 |
| 4,930,742 A | * | 6/1990 | Schofield et al. ....... 248/475.1 |
| 4,954,828 A | | 9/1990 | Orr |
| 4,986,385 A | | 1/1991 | Masaki |
| 5,014,947 A | * | 5/1991 | Wang ............... 248/214 |
| 5,020,754 A | * | 6/1991 | Davis et al. ............... 248/206.3 |
| 5,038,102 A | | 8/1991 | Glasheen |
| 5,049,885 A | | 9/1991 | Orr |
| 5,058,698 A | | 10/1991 | Yoshida et al. |
| 5,079,553 A | | 1/1992 | Orr |
| 5,083,129 A | | 1/1992 | Valentine et al. |
| 5,127,487 A | | 7/1992 | Yamamoto et al. |
| 5,134,406 A | | 7/1992 | Orr |
| 5,146,226 A | | 9/1992 | Valentine et al. |
| 5,151,701 A | | 9/1992 | Valentine et al. |
| 5,153,512 A | | 10/1992 | Glasheen |
| 5,164,729 A | | 11/1992 | Decker et al. |
| 5,177,685 A | | 1/1993 | Davis et al. |
| 5,206,500 A | | 4/1993 | Decker et al. |
| 5,206,651 A | | 4/1993 | Valentine et al. |
| 5,250,951 A | | 10/1993 | Valentine et al. |
| 5,300,932 A | | 4/1994 | Valentine et al. |
| 5,305,007 A | | 4/1994 | Orr et al. |
| 5,347,120 A | | 9/1994 | Decker et al. |
| 5,365,055 A | | 11/1994 | Decker et al. |
| 5,394,138 A | * | 2/1995 | Stephens ............... 340/463 |
| 5,400,034 A | | 3/1995 | Smith |
| 5,450,329 A | | 9/1995 | Tanner |
| 5,485,161 A | | 1/1996 | Vaughn |
| 5,504,482 A | | 4/1996 | Schreder |
| 5,515,042 A | | 5/1996 | Nelson |
| 5,530,447 A | | 6/1996 | Henderson et al. |
| 5,539,645 A | | 7/1996 | Mandhyan et al. |
| 5,559,508 A | | 9/1996 | Orr et al. |
| 5,667,176 A | * | 9/1997 | Zamarripa et al. ....... 248/231.51 |
| 5,668,554 A | | 9/1997 | Orr et al. |
| 5,815,092 A | | 9/1998 | Gregg, III et al. |
| 5,864,481 A | | 1/1999 | Gross et al. |
| 5,929,753 A | | 7/1999 | Montague |
| 5,955,973 A | | 9/1999 | Anderson |
| 5,977,884 A | | 11/1999 | Ross |
| 5,983,161 A | | 11/1999 | Lemelson et al. |
| 6,084,510 A | | 7/2000 | Lemelson et al. |
| 6,118,403 A | | 9/2000 | Lang |
| 6,163,309 A | * | 12/2000 | Weinert ............... 345/7 |
| 6,201,493 B1 | | 3/2001 | Silverman |
| 6,204,798 B1 | | 3/2001 | Fleming, III |
| 6,252,544 B1 | | 6/2001 | Hoffberg |
| 6,384,776 B1 | | 5/2002 | Martin |
| 6,400,304 B1 | | 6/2002 | Chubbs, III |
| 6,449,540 B1 | * | 9/2002 | Rayner ............... 340/901 |
| 6,567,035 B1 | | 5/2003 | Elliott |
| 6,600,409 B2 | * | 7/2003 | Cohen ............... 340/425.5 |
| 6,614,385 B2 | | 9/2003 | Kuhn et al. |
| 6,670,905 B1 | | 12/2003 | Orr |
| 6,718,239 B2 | | 4/2004 | Rayner |
| 6,750,785 B2 | | 6/2004 | Trajkovic et al. |
| 6,779,765 B2 | * | 8/2004 | Zheng et al. ............... 248/206.3 |
| 6,895,324 B2 | | 5/2005 | Straub |
| 6,906,632 B2 | * | 6/2005 | DeLine et al. ............... 340/815.4 |
| 6,973,377 B2 | | 12/2005 | Majstorovic et al. |
| 6,977,630 B1 | * | 12/2005 | Donath et al. ............... 345/7 |
| 6,985,753 B2 | | 1/2006 | Rodriguez et al. |
| RE39,038 E | | 3/2006 | Fleming, III |
| 7,013,207 B2 | | 3/2006 | Majstorovic et al. |
| 7,023,374 B2 | | 4/2006 | Jossef et al. |
| 7,113,107 B2 | | 9/2006 | Taylor |
| 7,124,006 B2 | | 10/2006 | Davidson et al. |
| 7,183,942 B2 | | 2/2007 | Rock et al. |
| 7,248,159 B2 | | 7/2007 | Smith |
| 7,298,248 B2 | | 11/2007 | Finley et al. |
| 7,301,494 B2 | | 11/2007 | Waters |
| 7,362,239 B2 | | 4/2008 | Franczyk et al. |
| 7,411,493 B2 | | 8/2008 | Smith |
| 7,471,236 B1 | | 12/2008 | Pitt et al. |
| RE40,653 E | | 3/2009 | Fleming, III |
| 7,519,471 B2 | * | 4/2009 | Shibata et al. ............... 340/903 |
| 7,532,149 B2 | * | 5/2009 | Banko et al. ............... 342/20 |
| 7,764,219 B2 | | 7/2010 | Pitt et al. |
| 2002/0022920 A1 | | 2/2002 | Straub |
| 2002/0135504 A1 | | 9/2002 | Singer |
| 2003/0011470 A1 | * | 1/2003 | Cohen ............... 340/425.5 |
| 2003/0020603 A1 | * | 1/2003 | DeLine et al. ............... 340/425.5 |
| 2003/0052797 A1 | | 3/2003 | Rock et al. |
| 2003/0139150 A1 | | 7/2003 | Rodriguez et al. |
| 2003/0218562 A1 | | 11/2003 | Orr |
| 2004/0066376 A1 | * | 4/2004 | Donath et al. ............... 345/169 |
| 2006/0132349 A1 | | 6/2006 | Stern et al. |
| 2007/0067086 A1 | | 3/2007 | Rothschild |
| 2007/0109187 A1 | | 5/2007 | Murphy |
| 2007/0266178 A1 | | 11/2007 | Wong et al. |
| 2010/0317420 A1 | | 12/2010 | Hoffberg |

OTHER PUBLICATIONS

Murakami Shinichi, Speed Excess Alarming Device, Abstract, Japanese Publication No. 09-027096, Published Jan. 28, 1997.

Tracker TEL GPS, Enforna GPS Modem—GPS Tracking Products and Services, Webpage printed Aug. 5, 2009, Copyright 2005-2008.

Sixnet Newsletter, Industrial Cellular Modems—Sixnet, Webpage Printed Aug. 5, 2009, Copyright 2008-2009.

Reach unlimited Corporation, Trapster—Speed Trap Sharing System, Webpage printed Aug. 20, 2009, Copyright 2008.

Weblogs, Inc., Free iPhone App Prevents Speeding Tickets, Webpage printed Aug. 19, 2009, Copyright 2003-2009.

Motor Trend Magazine Blog, It's Not a Radar Detector. It's a Trapster, posted Nov. 12, 2008, printed Aug. 19, 2009.

International Patent Office, International Search Report for PCT/US2010/024915, Feb. 22, 2010.

Cobra Operating Manual, IntellilLinkä Wireless Remote Series XRS-R9G, Copyright 2007.

* cited by examiner

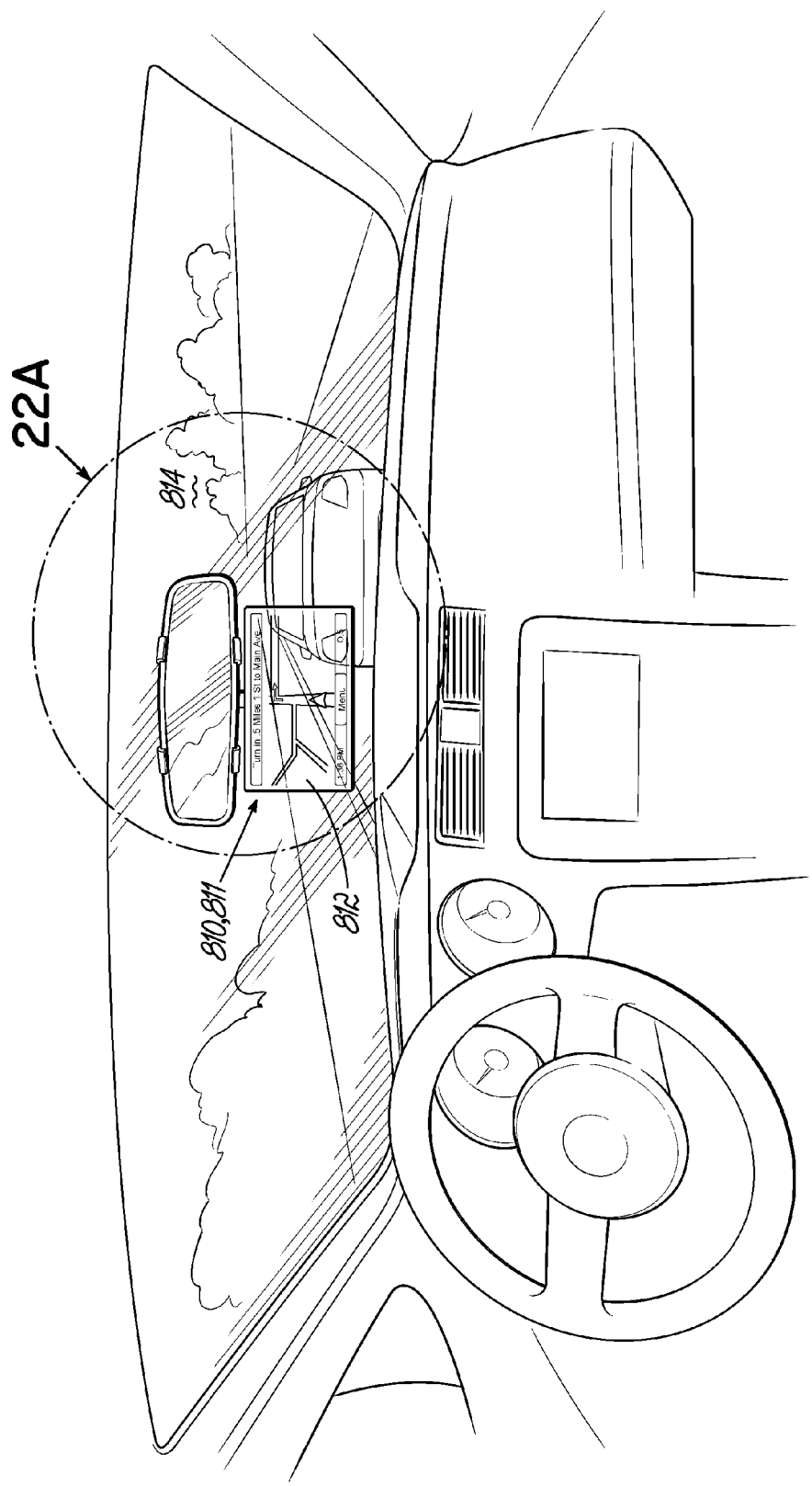

RADAR DETECTOR WITH NAVIGATION FUNCTION

RELATED APPLICATION

This application is a continuation in part of and claims priority to U.S. Ser. No. 12/195,147, filed Aug. 20, 2008, which is incorporated herein in its entirety. This application also claims benefit (via application Ser. No. 12/195,147) to U.S. Provisional Patent Application Ser. No. 60/956,847, filed Aug. 20, 2007 and U.S. Provisional Patent Application Ser. No. 60/984,167, filed Oct. 31, 2007, both of which are hereby incorporated by reference herein in their entirety. This application is related to but does not claim priority to U.S. Ser. No. 11/468,196, filed Aug. 29, 2006 and currently abandoned, which is a U.S. divisional application of U.S. Ser. No. 10/396,881, filed Mar. 25, 2003 and currently abandoned, which is a divisional of U.S. Ser. No. 09/889,656, filed Jul. 19, 2001 (with the declaration under Section 371(c)(4) filed Mar. 15, 2002), now U.S. Pat. No. 6,670,905, which is a U.S. National Phase of PCT/US00/16410 filed Jun. 14, 2000, which claims benefit of both U.S. Provisional Patent Application Ser. No. 60/139,097, filed Jun. 14, 1999, and U.S. Provisional Patent Application Ser. No. 60/145,394, filed Jul. 23, 1999, all of which are hereby incorporated by reference herein in their entirety.

FIELD OF THE INVENTION

The present invention relates to radar warning receivers and vehicle navigation systems.

BACKGROUND OF THE INVENTION

Radar detectors warn drivers of the use of police radar, and the potential for traffic citations if the driver exceeds the speed limit. The FCC has allocated several regions of the electromagnetic spectrum for police radar use. The bands used by police radar are generally known as the X, K and Ka bands. Each relates to a different part of the spectrum. The X and K bands are relatively narrow frequency ranges, whereas the Ka band is a relatively wide range of frequencies. By the early 1990s, police radar evolved to the point that it could operate almost anywhere in the 1600-megahertz wide Ka band. During that time radar detectors kept pace with models that included descriptive names like "Ultra Wide" and "Super Wide." More recently, police have begun to use laser (optical) systems for detecting speed. This technology was termed LIDAR for "Light Detection and Ranging."

Radar detectors typically comprise a microwave receiver and detection circuitry that is typically realized with a microprocessor or digital signal processor (DSP). Microwave receivers are generally capable of detecting microwave components in the X, K, and very broad Ka band. In various solutions, either a microprocessor or DSP is used to make decisions about the signal content from the microwave receiver. Systems including a digital signal processor have been shown to provide superior performance over solutions based on conventional microprocessors due to the DSP's ability to find and distinguish signals that are buried in noise. Various methods of applying DSP's were disclosed in U.S. Pat. Nos. 4,954,828, 5,079,553, 5,049,885, and 5,134,406, each of which is hereby incorporated by reference herein.

Police use of laser has also been countered with laser detectors, such as described in U.S. Pat. Nos. 5,206,500, 5,347,120 and 5,365,055, each of which is incorporated herein by reference. Products are now available that combine laser detection into a single product with a microwave receiver, to provide comprehensive protection.

The DSP or microprocessor in a modern radar detector is programmable. Accordingly, they can be instructed to manage all of the user interface features such as input switches, lights, sounds, as well as generate control and timing signals for the microwave receiver and/or laser detector. Early in the evolution of the radar detector, consumers sought products that offered a better way to manage the audible volume and duration of warning signals. Good examples of these solutions are found in U.S. Pat. Nos. 4,631,542, 5,164,729, 5,250,951, and 5,300,932, each of which is hereby incorporated by reference, which provide methods for conditioning the response generated by the radar detector.

Methods for conditioning detector response are gaining importance, because there are an increasing number of signals present in the X, K, and Ka bands from products that are completely unrelated to police radar. These products share the same regions of the spectrum and are also licensed by the FCC. The growing number of such signals is rapidly undermining the credibility of radar detector performance. Radar detectors cannot tell the difference between emissions from many of these devices and true police radar systems. As a result, radar detectors are increasingly generating false alarms, effectively "crying wolf", reducing the significance of warnings from radar detectors.

One of the earliest and most prevalent unrelated Microwave sources is the automatic door system used in many commercial buildings such as supermarkets, malls, restaurants, and shopping centers. The majority of these operate in the X-Band and produce signals virtually indistinguishable from conventional X-Band Police Radar. Other than the fact that door opening systems are vertically polarized, vs. circular polarization for police radar, there is no distinction between the two that could be analyzed and used by a receiver design.

Until recently, virtually all of the door opening systems were designed to operate in the X-Band. As a result, radar detectors generally announced X-Band alerts far more often than K-Band. As these X-Band polluters grew in numbers, ultimately 99% of X-Band alerts were from irrelevant sources. X-Band alerts became meaningless. The only benefit that these sources offered the user was some assurance that the detector was actually capable of detecting radar. It also gave the user some intuition into the product's detection range. To minimize the annoyance to users, most radar detector manufacturers added a filter-like behavior that was biased against X-Band sources. Many also added "Band priority" that was biased against X and in favor of bands that were less likely to contain irrelevant sources such as K, Ka, and Laser. If signals in both X and K Bands were detected, band prioritization would announce K, since it was more likely be a threat to the driver. In the last few years, K-Band door opening systems have also grown in number. This has reduced the significance of the K-Band warning and further undercut the overall benefit to the user of a radar detector.

Another unrelated microwave signal is generated by traffic management systems such as the ARTIMIS manufactured by TRW, used in Cincinnati, Ohio. ARTIMIS stands for "Advanced Regional Traffic Interactive Management and Information System", and reports traffic flow information back to a central control center. Traffic congestion and other factors are analyzed by the control center. Control center employees use this information to formulate routing suggestions and other emergency information, which they transmit to a large distribution of overhead and roadside signs. In order to collect information on vehicle traffic, a roadside ARTIMIS station transmits an X-Band signal toward cars as they drive by. The ARTIMIS source, unlike the X-Band door opener systems, is distinguishable from police radar as it is not transmitted at a single fixed frequency. As a result, it is possible to differentiate police radar signals from sources such as ARTIMIS, and ignore ARTIMIS sources in newer detectors. Older detectors, however, do not incorporate this feature and could be obsolete in areas where ARTIMIS is in use.

Unrelated Microwave signals are also transmitted by a system called the RASHID VRSS. Rashid is an acronym for Radar Safety Brake Collision Warning System. This electronic device warns heavy trucks and ambulances of hazards in their path. A small number of these RASHID VRSS units have been deployed. They are categorized as a member of the non-stationary set of unrelated sources. As in the ARTIMIS example, detection of RASHID can be prevented.

Perhaps the biggest source of non-stationary unrelated sources is from other radar detectors. These are sometimes referred to as "polluting radar detectors," and present a serious threat to some detector products. An early example of this occurred in the mid 1980s when radar detectors using superhomodyne circuitry became popular. Such detectors leak energy in the X-Band and K-bands and appeared as police radar to other detectors. A solution to this problem is described in U.S. Pat. No. 4,581,769, which is hereby incorporated by reference in its entirety. A similar problem occurred in the early 1990's when the Ka band was widened. An unexpected result was that the wider Ka band then also detected harmonics of signals generated by local oscillators within many existing radar detectors. U.S. Pat. No. 5,305,007, which is hereby incorporated by reference in its entirety, describes a method for ignoring these polluting detectors.

At this time, there are very few signal sources that can cause false laser detections in comparison to the substantial list of false microwave signals just described. However there are certain types of equipment that can cause the amplifiers and detection circuitry used in a laser detector to generate a "false" detect. In particular, certain locations near airports have been demonstrated to cause such problems for various laser detector products. As a result, selected airport environments are examples of stationary signals that produce false laser detections.

As can be appreciated from the foregoing example, as sources of unrelated signals continue to propagate, radar detectors must continually increase in sophistication to filter unrelated sources and accurately identify police radar. Each of these changes and enhancements has the potential effect of obsoleting existing detectors that do not include appropriate countermeasures. Furthermore, some sources, particularly stationary door opener sources, at this time cannot be filtered economically and thus threaten the usefulness of even the most sophisticated modern radar detector.

During the 1980s, the functionality of radar detectors expanded into other classes of driver notification. A system was developed that required a special transmitter be placed on emergency vehicles, trains, and other driving hazards. The term emergency radar was coined, and a variety of products were introduced that could detect these transmitters. One such solution was disclosed in U.S. Pat. No. 5,559,508, which is hereby incorporated by reference herein in its entirety. Another system was later introduced offering a larger class of hazard categories called the SWS system. Both emergency radar and SWS involve the transmission of microwave signals in the K band. Such signals are considered to be a part of the group of signal types that are intended to be detected by radar detectors.

A drawback of these warning systems is that stationary transmitters of these signals send the same message to drivers constantly, and become a nuisance during daily commute. This is beneficial to new drivers receiving the message for the first time. However these messages become an annoyance to drivers who follow the same path to work every day.

Thus, radar detector manufacturers are continually confronted with new problems to solve, due to the variety of different types of unrelated sources and their sheer numbers. The rate at which new or upgraded radar detector models are introduced continues to increase as manufacturers try to evolve their products to manage the growing number of unrelated sources. Meanwhile, the market for radar detectors is shrinking because consumers are no longer interested in buying products that so quickly become obsolete.

U.S. Pat. No. 6,670,905, issued Dec. 30, 2003 describes an invention that overcame some of these difficulties by providing a method of operating a radar detector that aids in the management of unrelated sources, and permitting the detector to dynamically improve its handling of unrelated sources. As noted above, many non-stationary sources can be identified and ignored using existing technology. However, many stationary sources cannot, as yet, be effectively filtered economically with existing technology. Accordingly, the '905 patent provides a radar detector that includes technology for determining the location of the detector, and comparing this location to the locations of known stationary sources, to improve the handling of such detections.

The Global Positioning Satellite System (GPS) offers an electronic method for establishing current physical coordinates very accurately. In the detailed embodiment described in the '905 patent, a radar detector utilizes a GPS system to determine its current position. The detector also maintains a list of the coordinates of the known stationary source "offenders" in nonvolatile memory. Each time a microwave or laser source is detected, it will compare its current coordinates to this list. Notification of the driver will take on a variety of forms depending on the setup configuration.

In one embodiment, a radar detector may ignore detections received in an area known to contain a stationary source. In the specific embodiment described in the '905 patent, substantially more sophisticated processing is performed to determine whether and what actions to take in response to a detection.

By adding GPS conditioning capabilities to a radar detector, the combination became a new product category that is capable of rejecting signals from any given location no matter what the nature of the microwave/laser signals might be from that location. In further advancements, U.S. patent application Ser. No. 11/567,000 filed Dec. 5, 2006 claiming priority to U.S. provisional application 60/742,301 both of which are hereby incorporated by reference herein, makes use of traffic information received via radio transmissions to further enhance the utility of the radar detector/navigation device. This has a dramatic effect on the usable life of the product and subsequent value to its owner.

SUMMARY OF THE INVENTION

In one aspect, the invention features a navigation and radar detection device including a touch screen that provides information on the status of the receiver section and/or warning section in a variety of visual arrangements. In a particular embodiment, the touch screen presents a touch screen button that, when touched, permits the selection of one of at least two arrangements in which information is displayed on the touch screen display.

In a second aspect, the invention features a navigation and radar detection device having, in its cockpit mounted housing, a receiver that includes a radar reflector within the housing for reflecting radar signals in a signal band used in the context of law enforcement activity to said receiver section, thus, for example, permitting a compact device housing in which the antenna horn has its long axis parallel to the plane of the display screen. The deflector may be parabolic, and receive radar signal signals from in front of the vehicle and reflecting them to said antenna.

In a third aspect, the invention features a radar detection device for attachment to a ground vehicle that comprises a transparent or translucent display screen allowing viewing of the vehicle surrounding through the display screen, and a mounting that mounting the display screen adjacent to the vehicle windshield. The screen may, for example, be an OLED LCD display, and may be touch sensitive. Furthermore, the mounting may mount to the dashboard or to the rearview mirror.

In a fourth aspect, the invention features a windshield mount and radar detecting device comprising a member that affixes to a windshield coupled to a clip with an upward facing tab, and a radar detecting device having a housing with a front facing surface, the front facing surface defining a downward facing opening adapted to receive the upward facing tab. In particular embodiments, the mount further comprises a snap with a downward facing tab, and the front facing surface of the device further comprises a clasp adapted to engage the snap. Further, the upward facing tab may have a tapered edge to facilitate mounting of said downward facing opening thereto.

The above and other objects and advantages of the present invention shall be made apparent from the accompanying drawings and the description thereof.

DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIGS. 22 and 22A illustrate an embodiment of a detector that has a screen that is at least partially transparent, and is suspended from a rearview mirror.

DETAILED DESCRIPTION OF THE DRAWINGS

Figure 1:
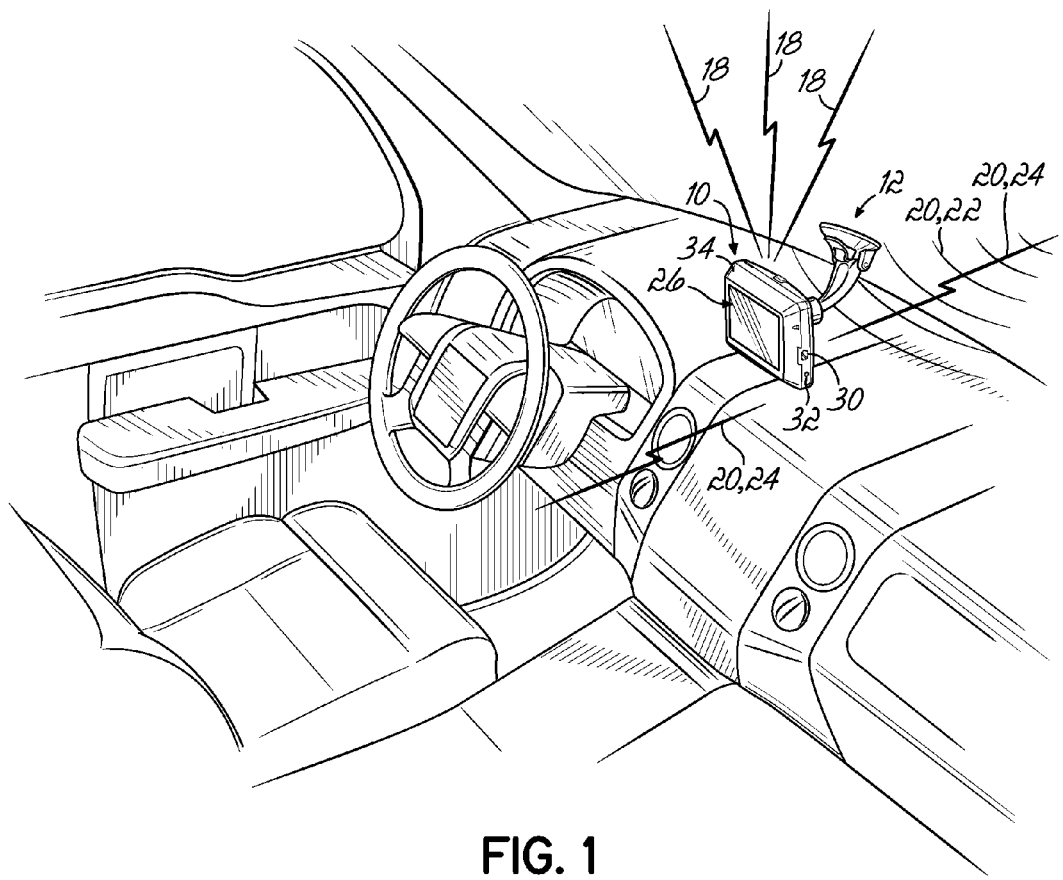
FIG. 1 is an illustration of a first embodiment of a navigation and police activity warning device receiving radar signals from police radar and from a number of unrelated sources, and further receiving global positioning signals from a global positioning satellite.
Figure 2:
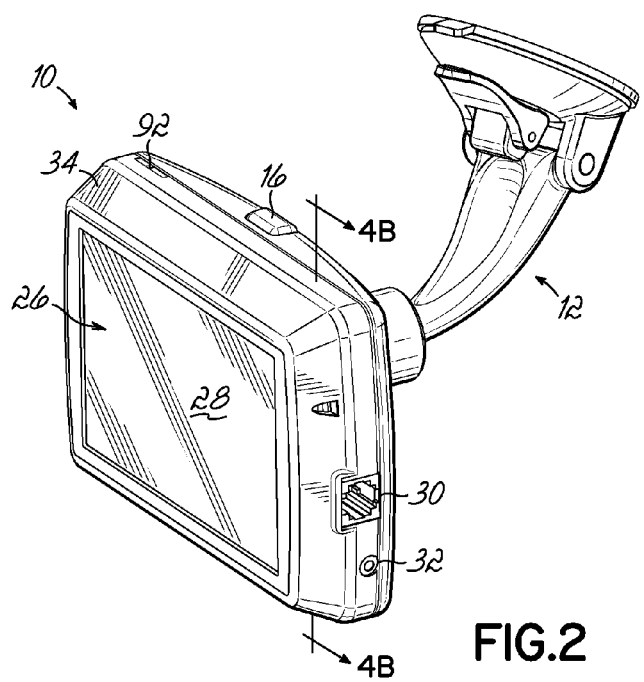
FIG. 2 is a close-up view of the device of FIG. 1.

With reference to FIGS. 1 and 2, a navigation and police warning device 10 is inside a motor vehicle coupled to a mount 12 and releasable by a release button 16. The device 10 receives GPS positioning signals 18 and electromagnetic and optical police signals 20 in the form of radar 22 and LIDAR (laser) 24. A display 26 is visible to a driver and includes a touch screen 28. The touch screen 28 provides the functions of a keypad, and buttons, that units without a touch screen 28 may use instead. A power and communication receptacle 30 and a headphone jack 32 are visible on the right side of the device.

Figure 3:
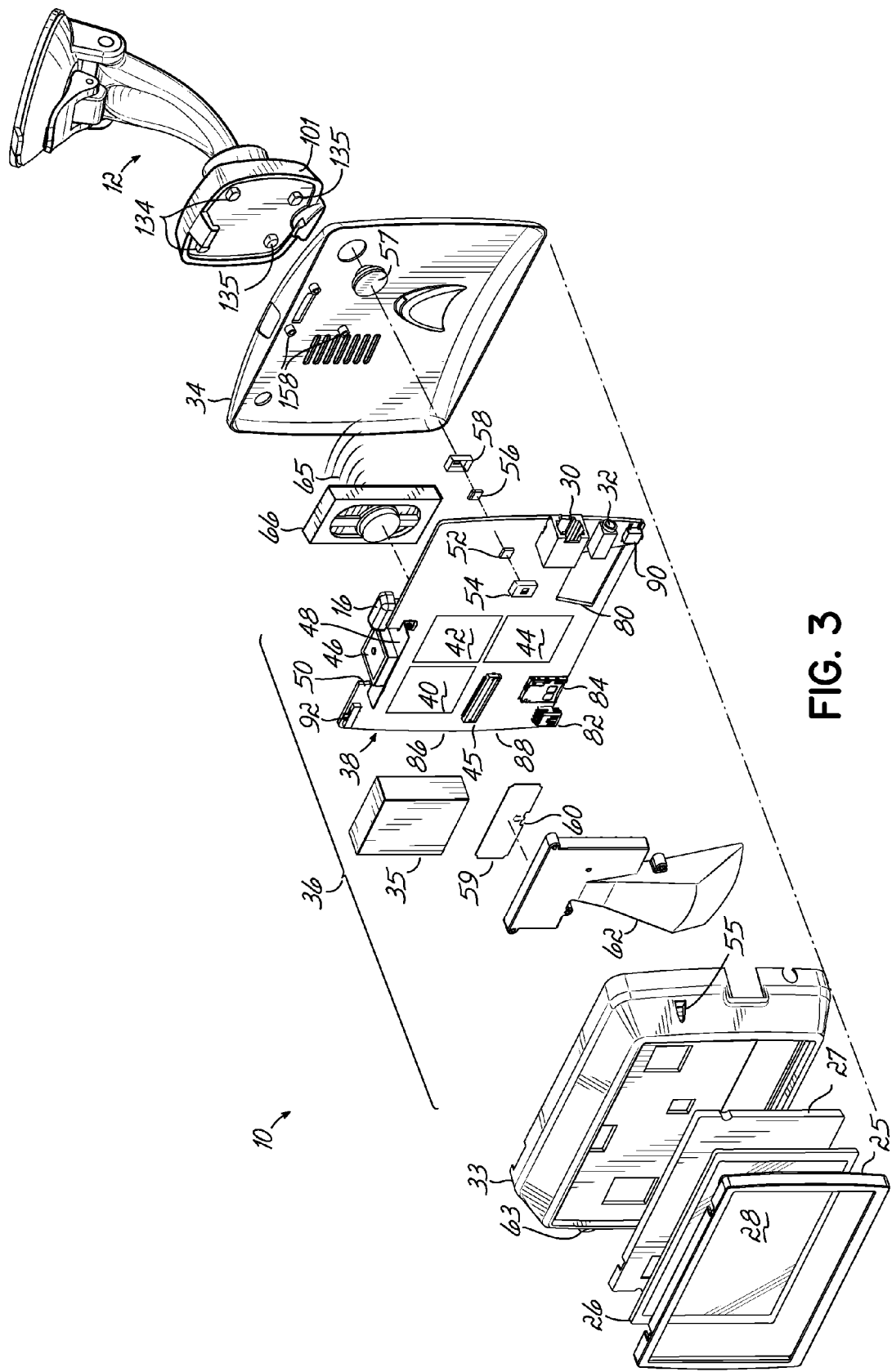
FIG. 3 is a partially exploded schematic illustration of the device of FIG. 2.

In FIG. 3 a housing front 33, a housing back 34, a battery 35, and the display 26 are separated from an electronics portion 36 and the mount 12. The display 26 is secured by a frame 25 and a boot 27 to the front housing 33. To appreciate the location and orientation of the electronics, it helps to know that the navigation displays that drivers are accustomed to seeing are vertical and generally facing the back of the vehicle and angled towards the driver. Since a navigation display 26 must be large enough for a driver to see, navigation units have a generally tall and wide geometry relative their thickness (front to back in the vehicle). In contrast, a radar receiver is usually oriented to present a small visible profile as seen from the front of the vehicle, thus it generally has a small height, a medium width, and a relatively longer thickness (front to back in the vehicle). To simply combine the circuit board of a navigation unit and a radar receiver into the same housing would make the product have a relatively large height, width, and depth. It would obstruct a greater amount of the driver's vision, and make it more apparent to observers that a radar detector is being used. Such a device is one embodiment of the current invention, but not one that is illustrated.

The embodiment illustrated in FIG. 3 has a circuit board 38 comprised of three main functional areas: a navigation section 40, a receiver section 42, and a warning section 44. The circuit board 38 communicates to the display 26 through a twenty-four pin connector 45. In this description, a single circuit board 38 is referred to, however one skilled in the art would realize that this may be made in the form of multiple circuit boards, or even shrunk to circuits smaller than circuit boards. Further, the representation of a navigation section 40, a receiver section 42, and a warning section 44 in the figures is schematic and only for the purposes of description. The navigation section 40 includes a GPS antenna 46 mounted on a GPS bracket 48 at a cutout 50 near the top of the circuit board 38, that communicate to a GPS receiver and a separate DGPS (differential GPS) receiver (neither shown). The receiver section includes a laser detector comprising a photodiode 52 under a shield 54 at a window 55 to detect laser 24 from behind the vehicle, and a photodiode 56 under a shield 58 at a window 57 to detect laser 24 from the front of the vehicle, along with processing circuitry. The receiver section 42 further includes an RF circuit board 59 having an antenna 60 that receives focused microwaves from a horn 62 having a ridge 64, explained in greater detail with reference to FIG. 5. The RF circuit board 59 may send the signal through a digital signal processor (not shown). It may be further supplemented by a Radar Detection CPU (optional) placed in the vehicle. The navigation section 40, receiver section 42, warning section 44, and other components work together through a fusion processor with EEPROM (both not shown), such as, for example, disclosed in U.S. patent application Ser. No. 12/195,147 filed Aug. 20, 2008, that is herein incorporated by reference in its entirety by a previous incorporation statement. Further, the fusion processor may have a vehicle interface such as an ODB II compliant interface for connection to a vehicle electronic system. An alert 65 may be issued through a speaker 66, or the headphone jack 32, communication receptacle 30, or any other similar component such as a light emitting diode 63 advantageously located on the front left corner close to the driver.

Figure 4A:
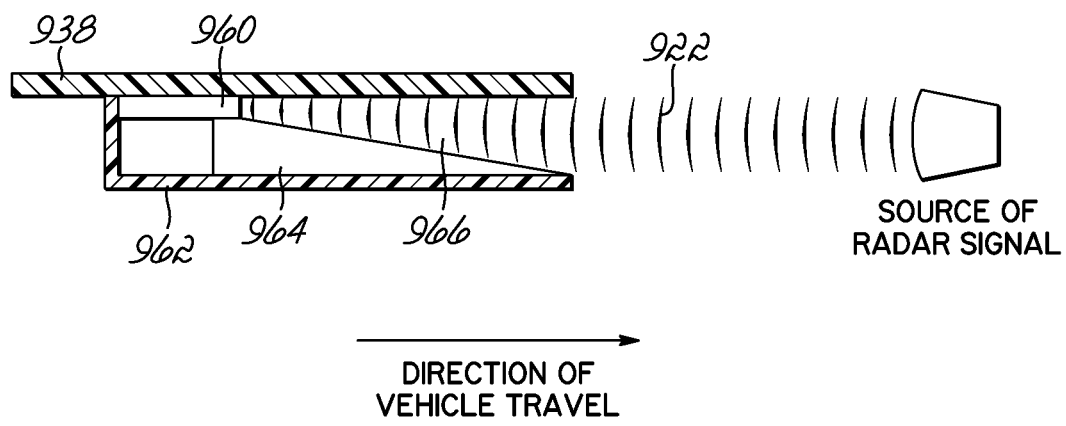
FIG. 4A is a schematic cross-section view of a PRIOR ART horn and antenna in a radar device without a reflector.

With reference to schematic Prior Art FIG. 4A: As is known in the art, for example in U.S. Pat. No. 7,388,537 to Martinson et al. assigned to Escort Incorporated, the assignee of the current application, an antenna 960 is a slender strip of metal in the plane of the circuit board 938 on which a horn 962 with a ridge 964 focuses the microwaves 922. In many previous radar detectors the horn 962 faces the front of the vehicle and has a passage 966 that converges and focuses the microwave energy onto the antenna 960 oriented in a generally horizontal plane in the vehicle.

U.S. Pat. No. 4,952,937 is hereby incorporated by reference in its entirety. A remote mounted radar unit is shown in greatest detail FIG. 2 of U.S. Pat. No. 4,952,937; this unit is designed for mounting in a vehicle grille. The remote unit includes uses a radar reflector to aid in properly sizing the housing of the remote unit so that it can be placed behind the vehicle's license plate.

Figure 4B:
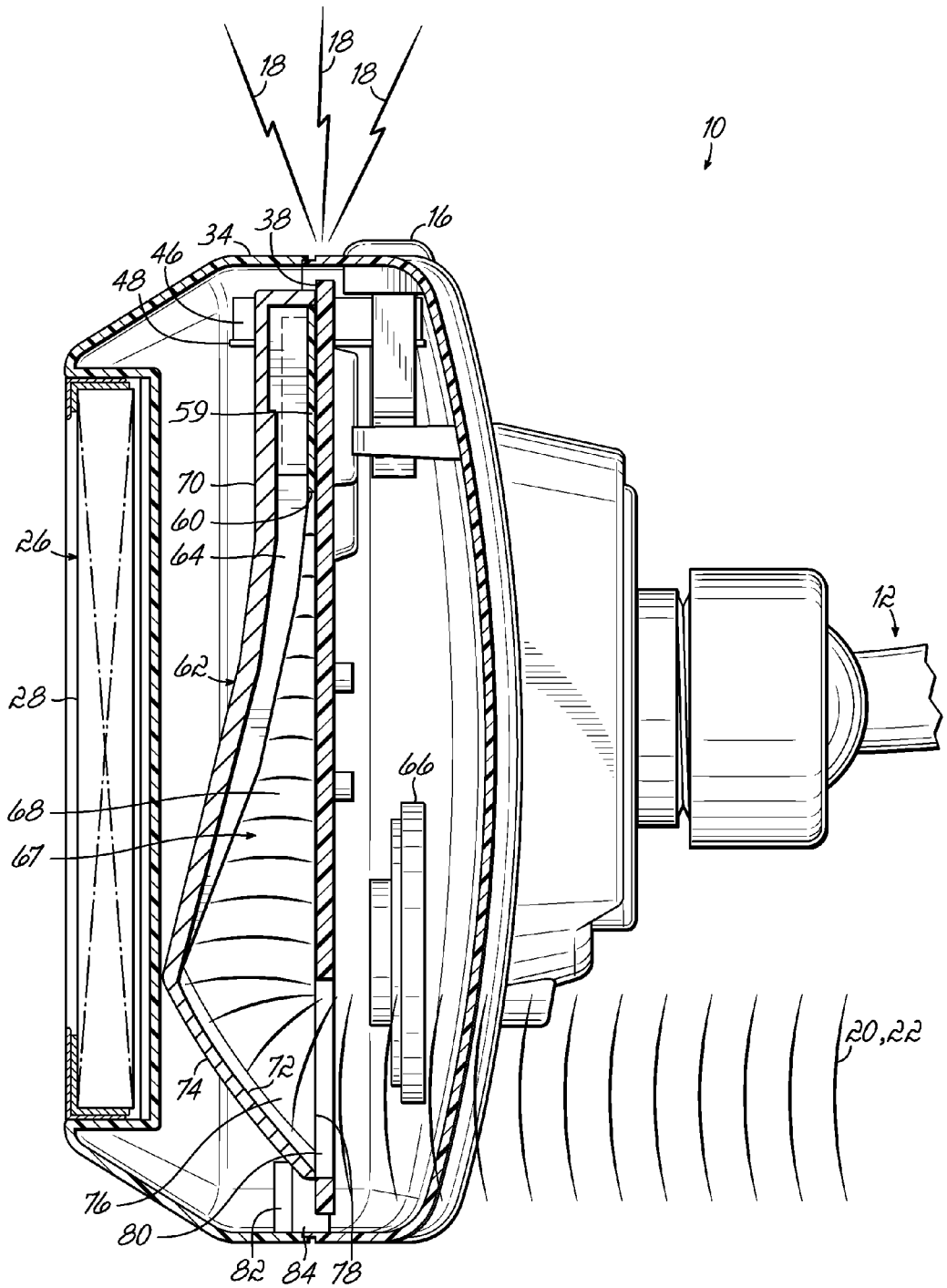
FIG. 4B is a partial cross-section view as indicated in FIG. 2.
Figure 5:
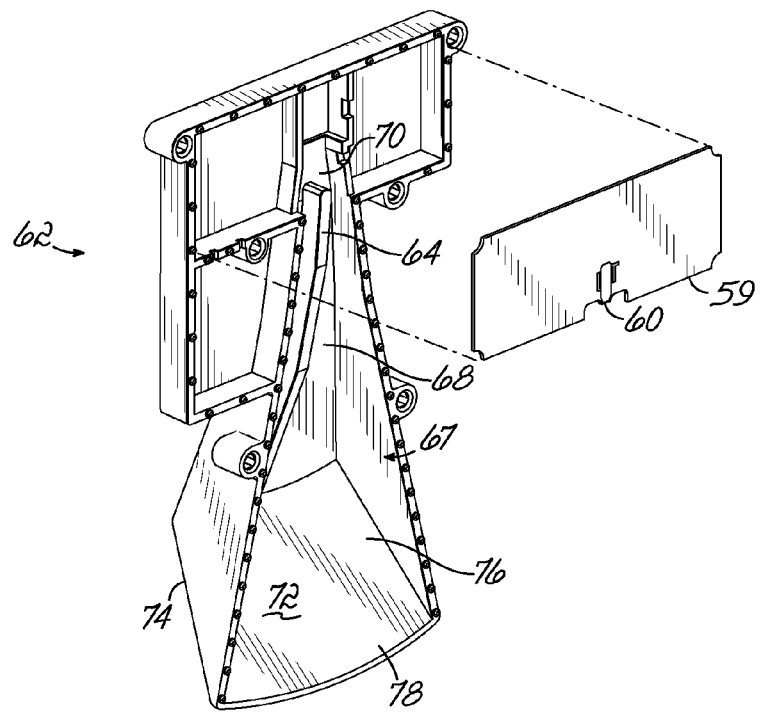
FIG. 5 is a close-up view of the underside of the horn shown in FIG. 3 and the RF circuit board to which it mates.

A vertical mounting with a radar reflector is used in conjunction with the present invention. In FIGS. 3, 4B and 5, the circuit board 38 and the RF circuit board 59 with the antenna 60 can be seen, oriented vertically to fit the general contours of the display 26. Horn 62 has a ridge 64 in a first passage 67 comprising a straight portion 68 with the antenna 60 generally at a first end 70 and a reflector 72 at the second end 74. The reflector 72 is a parabolic surface, but in other embodiments it may be a straight surface or other shapes. The passage is coupled to a second passage 76 at an approximately right angle to the first, with an entrance 78 that faces approximately forward in the vehicle and is aligned with an aperture 80 in the circuit board 38. Microwaves 22 enter from the front of the vehicle and reflect off the reflector 72 towards the first passage 67 to be focused on the antenna 60 by the ridge 64 that has an incline and a taper so that it eventually contacts the antenna 60.

Additional items are included to provide data input and output from the illustrated device, which may be obtained from databases or other sources of information, for example databases on the internet, a personal computer, a personal digital assistant, a CPU in the vehicle, or other devices. This information can be obtained through a mini USB port 82 and/or a micro SD slot 84. Further descriptions of use of these devices and other interfaces, are described in U.S. patent application Ser. No. 12/389,978 filed Feb. 20, 2009 and hereby incorporated by reference herein in its entirety. In some embodiments switches may be used to receive user inputs other than those entered through the touch screen 28. For example, these may be user inputs to change the mode of the device from training mode to one of a variety of operating modes. At the lower right is a reset button 90, accessed through a hole (not shown) in the housing. As in many electronic devices, reset button 90 provides a user the ability to reset the device during unusual circumstances. A three position slide switch 92 has an on position, a momentary on/off position, and a locked position that prevents user inputs in accordance with functional scenarios, such as when the device is being carried.

Figure 6:
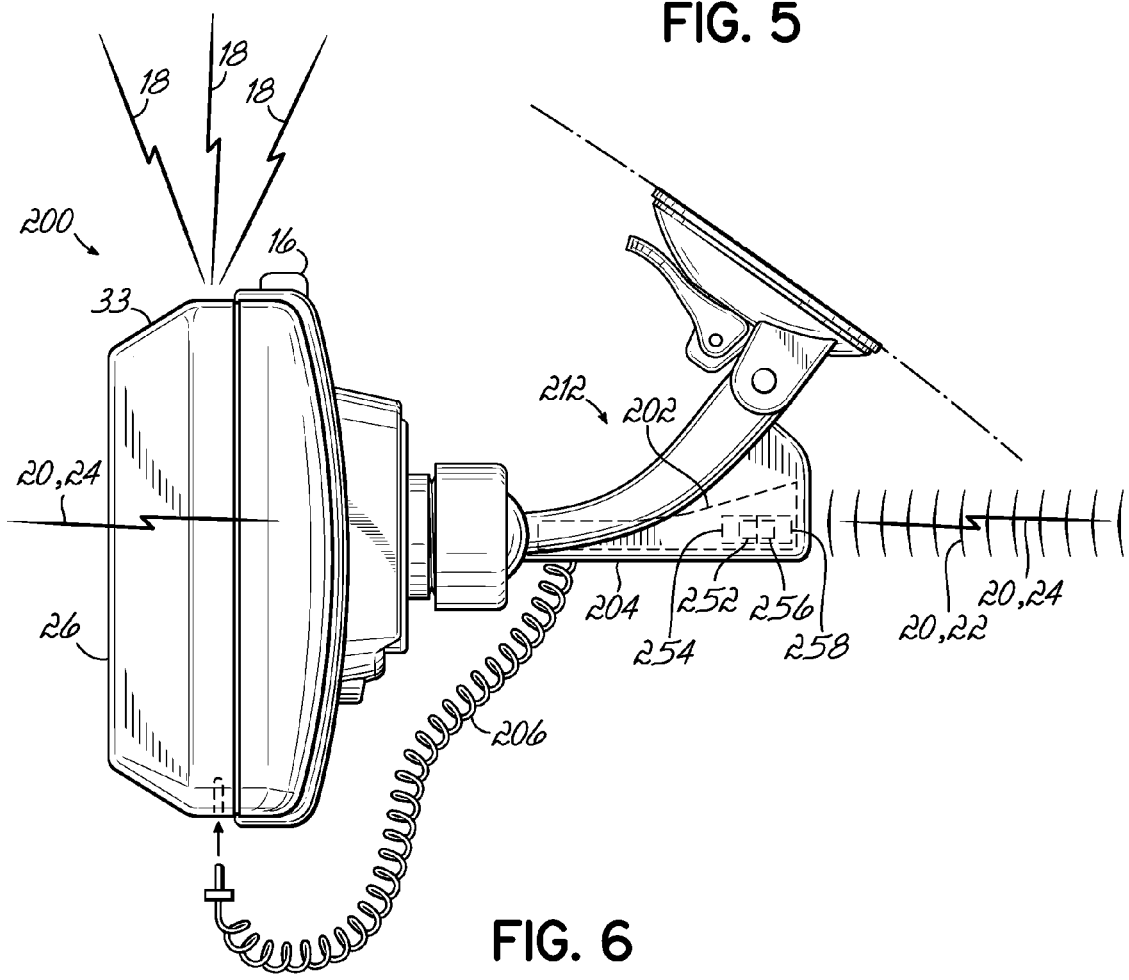
FIG. 6 is a schematic of a second embodiment of a navigation and police activity warning device.

FIG. 6 illustrates an embodiment 200 of a navigation and police warning device having a horizontally mounted antenna horn 202. In this embodiment the orientation of the display 26 is decoupled from the RF circuit board 59 and antenna 60, specifically, horn 202 is oriented horizontally as in typical radar detectors. A second housing 204 on a mount unit 212 contains horn 202 and a circuit board 38 with at least the receiver section 42, and optionally the warning section 44 and/or the navigation section 40. The photodiodes 252, 256 and shields 254, 258 associated with the receiver section 42 are in the second housing 204. An electrical conductor 206 communicates information to the display 26 and any of the other sections, for example the navigation section 40, receiver section 42, or warning section 44 in the first housing 33, 34. In use, the mount unit 212 and second housing 204 may be left in the vehicle by detaching them from the first housing back 34 by using release button 16. Housing 33, 34 may be removed from the vehicle as desired, making it available for navigation-only purposes, for example by a person who wishes to use the device while walking or in another vehicle. The device may also be brought to a computer for updating of the database. Alternatively, all the sections involved in processing the signals 20, 22, 24 may be in the second housing 204. However this would leave more expensive components in the vehicle.

Figure 7:
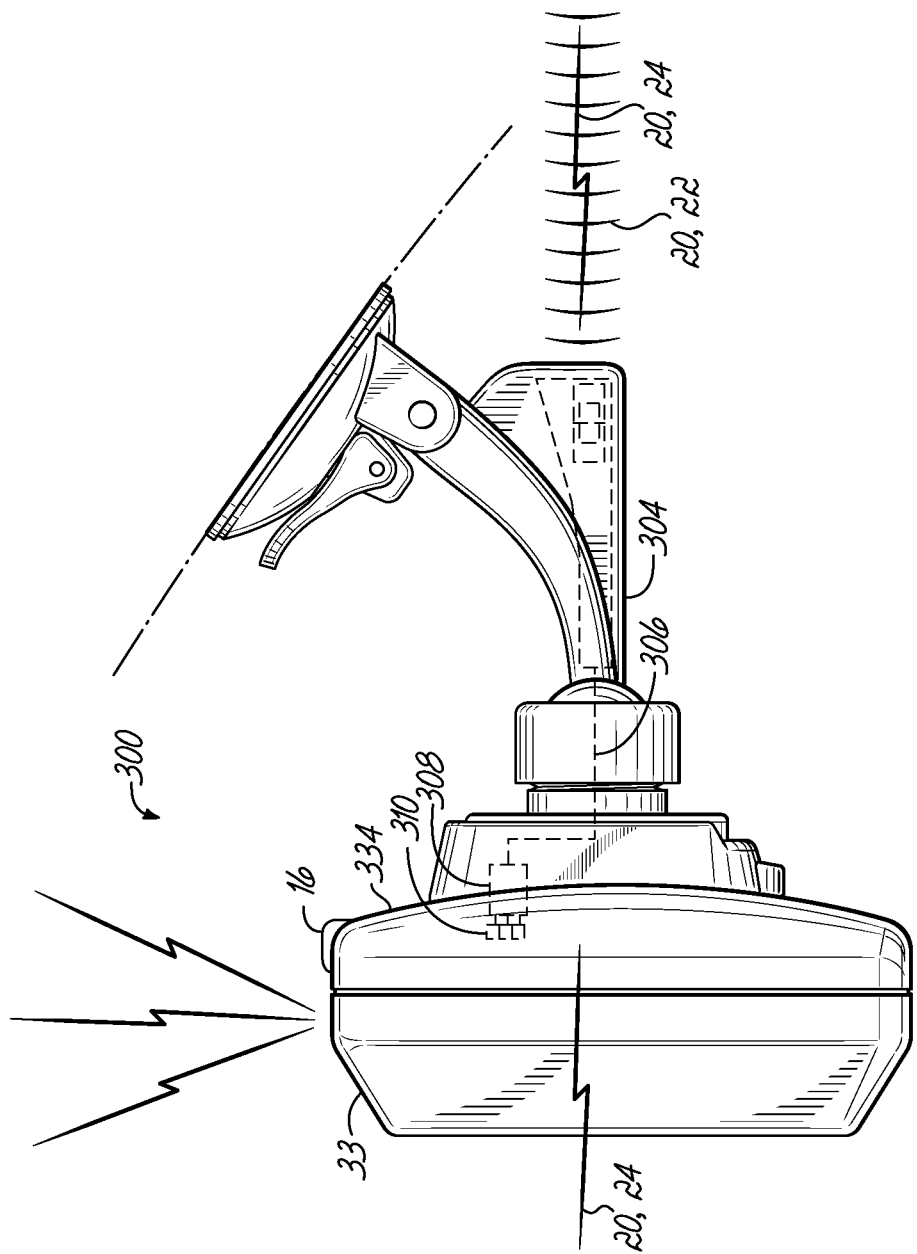
FIG. 7 is a schematic of a third embodiment of a navigation and police activity warning device.

FIG. 7 illustrates an embodiment 300 in which wiring 306 runs internal to mount assembly 312, from unit 304 to back housing 334. An arrangement such as this, with, for example, an electrical plug 308 protruding from the mount assembly 312 and a corresponding electrical socket 310 on the back housing 334 will allow the electrical connections to be completed automatically when the device is mounted.

Figure 8:
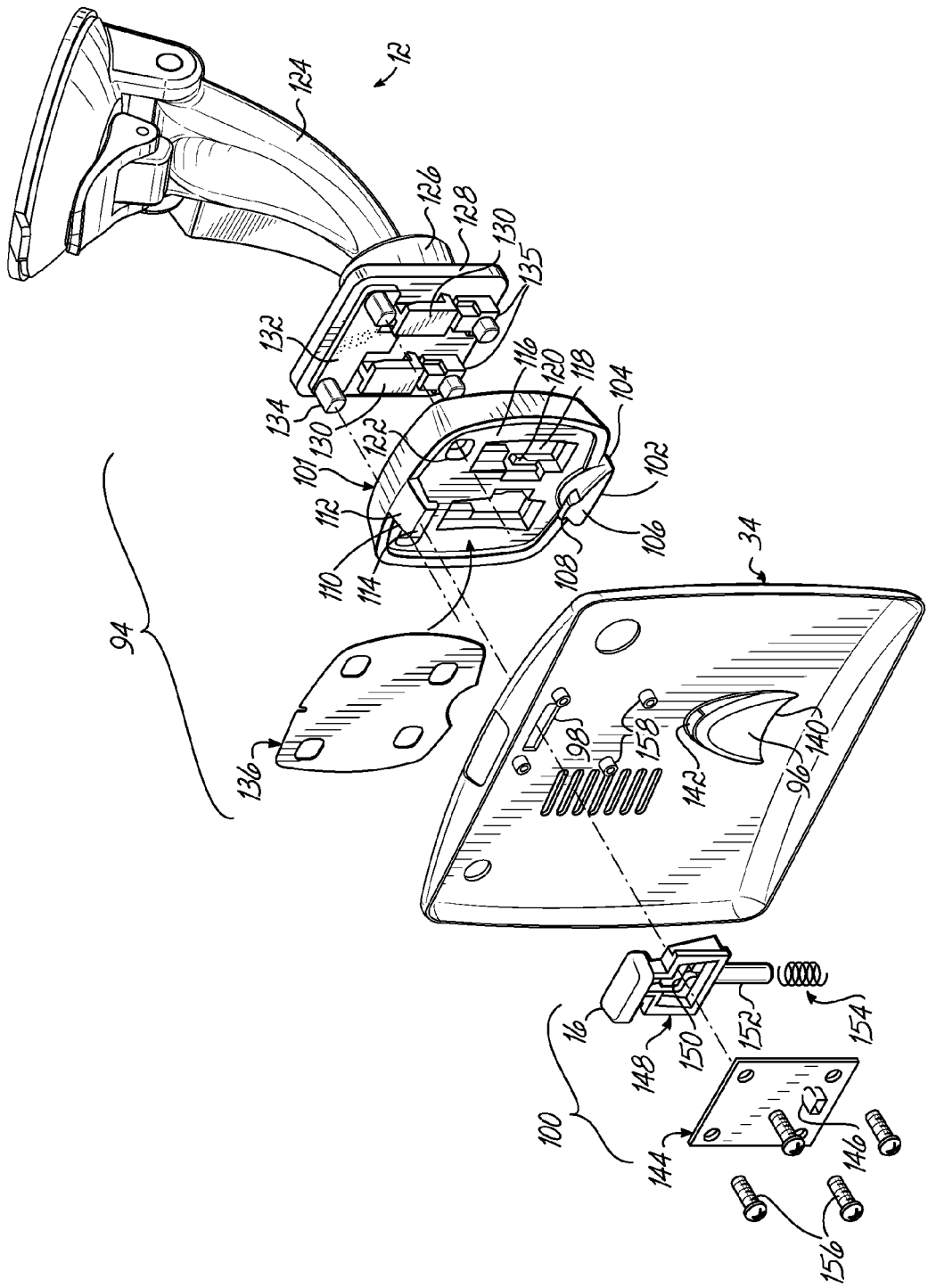
FIG. 8 is a partially exploded schematic illustration of a mounting system for the embodiments of the previous figures.

FIG. 8 illustrates components of a mounting system that facilitate easy mounting and dismounting of the device 10, 200, 300, to the mount 12. Broadly, the mount system comprises a clip assembly 94, a guide 96 and an aperture 98 in the back housing 34 that cooperate with the clip assembly 94, and a clasp assembly 100 inside the device 10, 200, 300.

The clip assembly 94 has a clip 101 with a receiver tab 102 having a horizontal portion 104, a vertical portion 106 and a tapered lead-in 108. Above the receiver tab is a snap 110 with a horizontal portion 112, and a vertical portion 114. The clip 101 has a vertical face 116 having two approximately rectangular passages 118 with resilient arms 120 along the interior edge of each passage 118. The arms 120 are biased to push in the outward direction, for example to the left and right of the vehicle. The vertical face also has two bumper apertures 122.

The mount 12 has a suction arm 124 and a nut 126 that holds a receptacle plate 128 having two projections 130. The clip 101 is placed onto receptacle plate 128 by passing the rectangular passages 118 over the projections 130 until the resilient arms 120 snap into place under the projections 130. A bumper mount 132 made of a soft resilient material, for example rubber, is trapped between the receptacle plate 128 and the clip 101, but two upper bumpers 134 (best seen in FIG. 3) and two lower bumpers 135 protrude through the bumper apertures 122. Once installed, the clip 101 is not intended to be removed from the receptacle plate 128 by the user. For that reason an adhesive back overlay 136 conceals the two resilient arms 120. Should it be necessary to remove the clip 101 from the receptacle plate 128, the overlay 136 can be removed, but it will likely be defaced. Then the clip 101 may be removed from the receptacle plate 128 by simultaneously deflecting the two resilient arms 120 inward to allow the clip 101 to be removed from the projections 130. Of course, the custom clip assembly 94 could be manufactured permanently as a part of the mount 12, but the pieces described allow the use of inexpensive and proven standard parts, for example receptacle 128, nut 126, and suction arm 124, that are used with other devices.

The housing back 34 has guide 96 molded into it. The guide 96 is wide at a lower end 140 and smaller at a top end 142, to snugly surround the receiver tab 102. Above the guide is the aperture 98 sized to receive the vertical portion 114 of the snap 110.

The clasp assembly 100 has a bracket 144 with a channel 146 oriented approximately vertically, a clasp 148 with a receiver 150 and a shaft 152, and a spring 154. The shaft 152 is captured in the channel 146 so that the clasp 148 is biased upwardly by the spring 154. The clasp assembly 100 is held by fasteners 156 and bosses 158 in the device 10 so that when release button 16 is depressed, receiver 150 aligns with aperture 98, but when release button 16 is free, the spring 154 biases the clasp assembly 100 to capture snap 110.

Figure 8A:
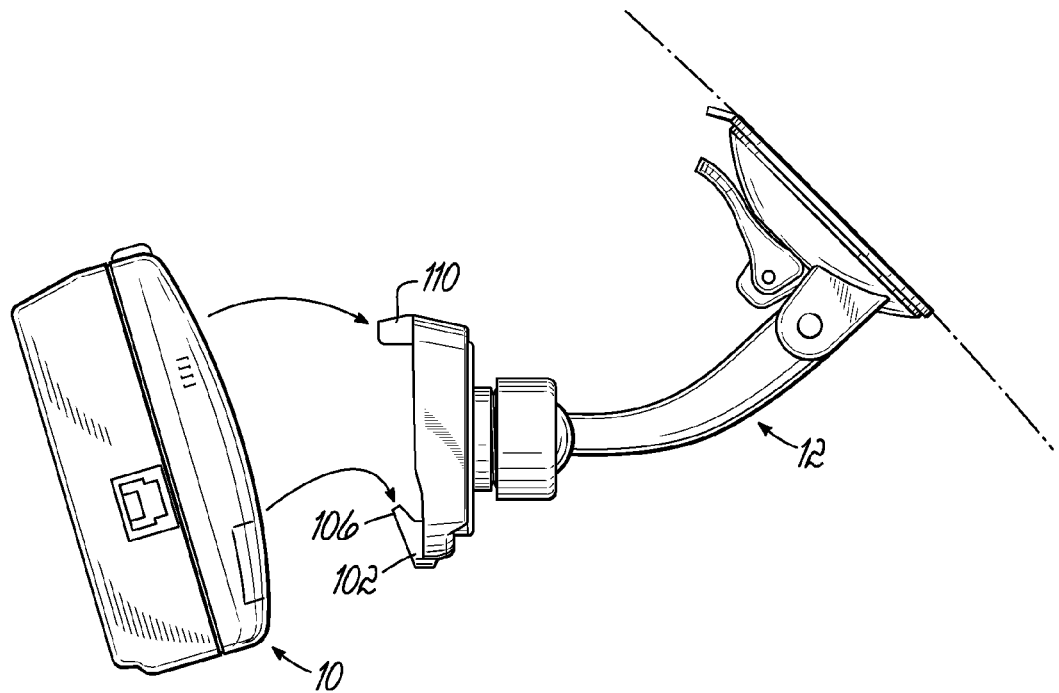
FIGS. 8A and 8B are schematic illustrations of the use of the mounting system of FIG. 8.
Figure 8B:
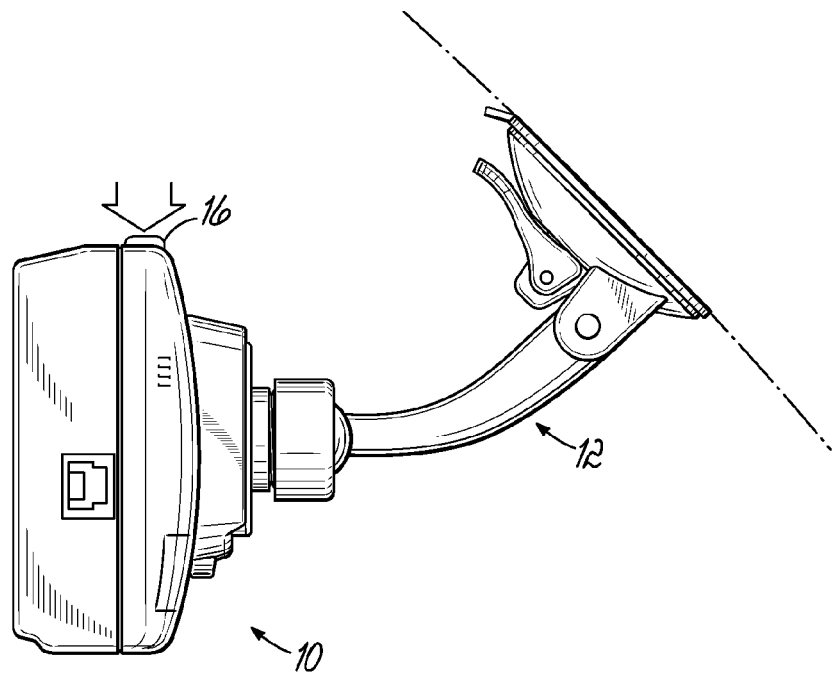

FIGS. 8A and 8B illustrate that the entire mount assembly 12, including the clip 101, overlay 136, and rubber bumpers 132, 134, 135, may be left on the windshield of a vehicle, while the device 10 is repeatedly removed and installed. To install, the device 10 is blindly placed so that the bottom 140 of the guide 96 goes over the receiver tab 102 which is guided to the appropriate resting location at the upper end 142 of the guide 96 by the downward motion of the device 10. Once in the proper location, the device 10 is rocked toward the stationary snap 110 using the receiver tab 106 as a fulcrum. The lead-in 108 self-centers and properly orients the device 10 such that the stationary snap 110 on the mount 12 will always engage with the aperture 98. The clasp 148 applies pressure to the mount's stationary snap 106 to prevent rocking and audible rattling. Rubber contact surfaces of the upper bumpers 134 and lower bumpers 135 on the mount 12 will also apply pressure to ensure a firm, stable interface between the mount 12 and the device 10. The removal of the device 10 from the mount 12 is achieved by depressing the release button 16, rocking the unit forward (to the back of the vehicle), and lifting the unit off of the receiver tab 106. The disclosed features aid with the functions of locating, orienting, receiving, securing, and releasing the unit. Furthermore, the mount 12 is relatively small, attractive, and unobtrusive when left on the windshield without a unit attached.

Figure 9:
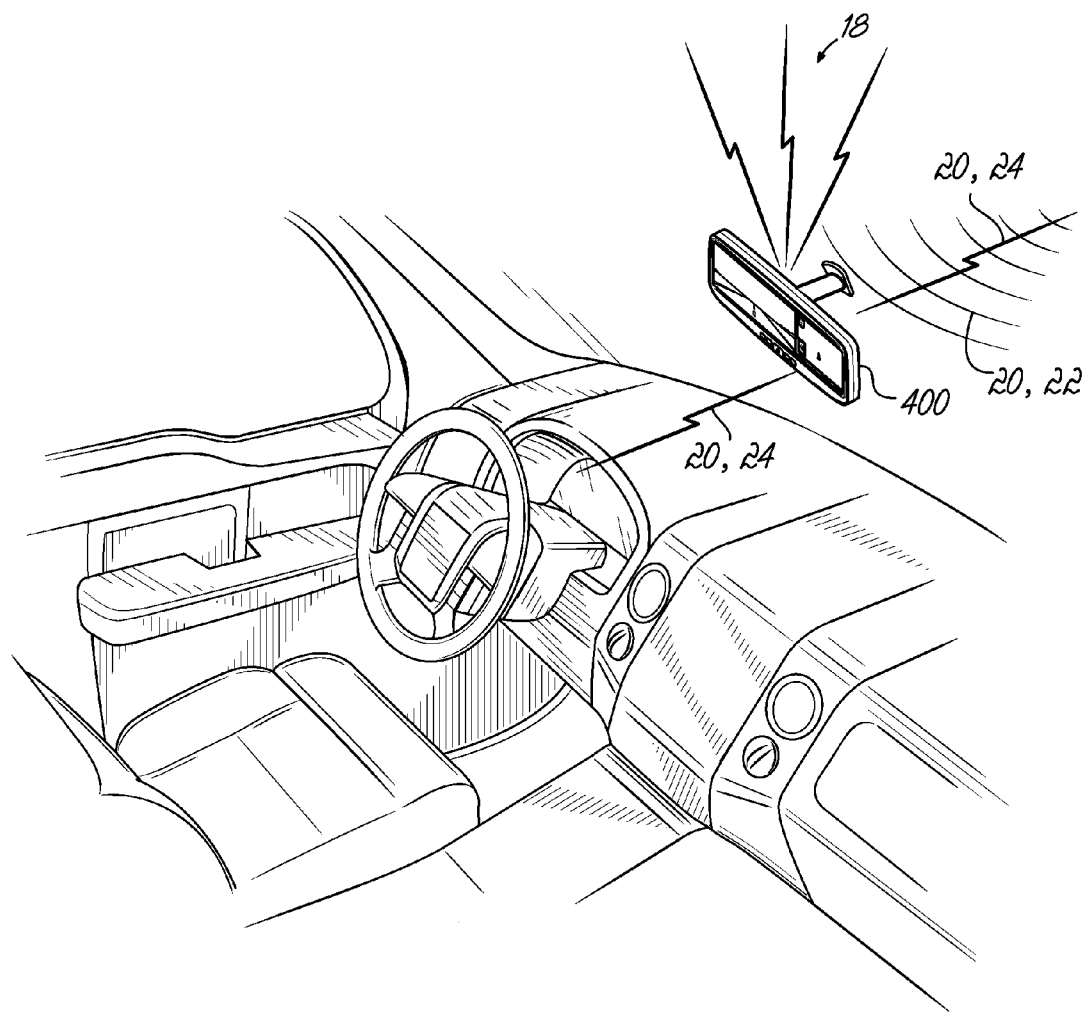
FIG. 9 is an illustration of a fourth embodiment of a navigation and police activity warning device receiving radar signals from police radar and from a number of unrelated sources, and further receiving global positioning signals from a global positioning satellite.
Figure 10:
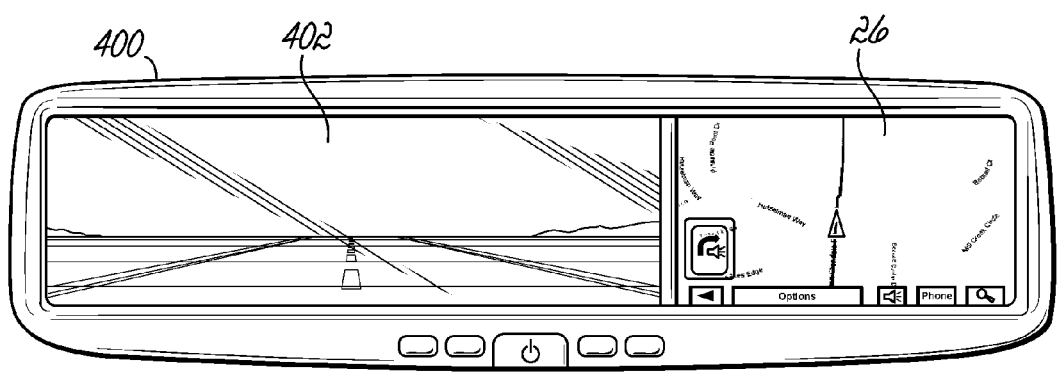
FIG. 10 is a front elevation view of the embodiment of FIG. 9.

Another embodiment 400 is illustrated in FIGS. 9 and 10. 400 is a rearview mirror with the features of device 10 included. That is to say that rather than mounting another item on the windshield by a separate mount, the device 400 takes the place on the windshield appropriate for a rear view mirror. The device 400 also provides the functionality of the rearview mirror by having a section of conventional mirror glass 402. For simplicity, external receptacles and other visible features of item 10 are not shown in FIGS. 9 and 10, but they may be appropriately placed for access by a user. Advantageously, item 400 has a large perimeter on which features may be placed.

Figure 11:
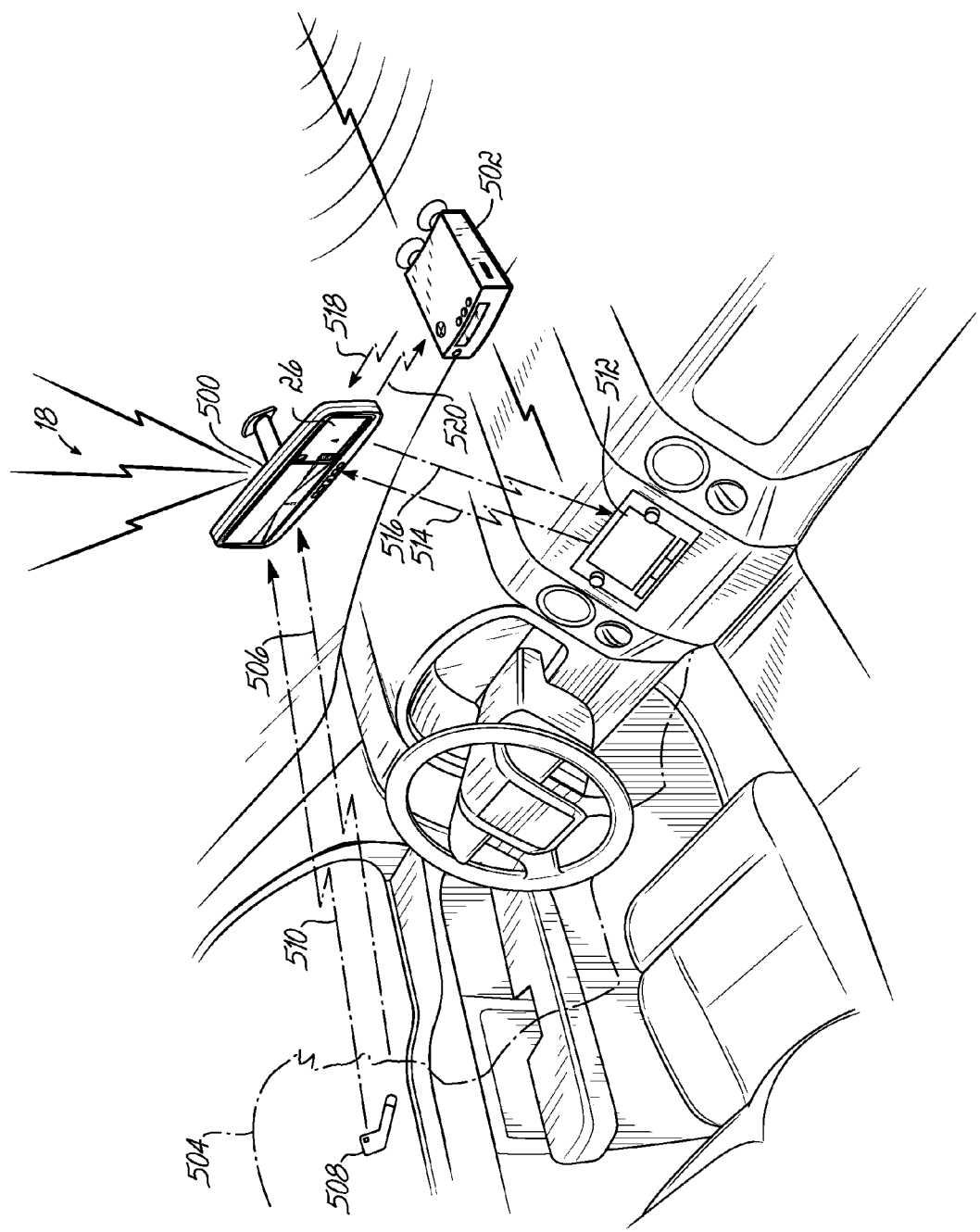
FIG. 11 is a schematic perspective view of a fifth embodiment of a navigation and police activity warning device in use, and communicating wirelessly.

FIG. 11 illustrates additional embodiments of the current invention. In previous embodiments, the detector portions of the device may or may not have been in the same housing as the navigational and display portions of the device. When in different housings, a wired connection 206 or 306 (FIGS. 6 and 7) occurred between them. In FIG. 11, an embodiment 500 communicates wirelessly with several devices. Device 500 has a primary duty of displaying the navigational information to the driver, as it has the display 26 and it receives the GPS signals 18. However, a radar detector 502 of a size and shape that is typical may be mounted separately. The information may flow wirelessly between the two, or alternatively may flow through wire (not shown). Similarly, the driver 504 may communicate with the device 500 in at least two ways. Since advantageously the device is mounted approximately level with the driver's head, the driver may speak sound commands directly to the mirror area, as indicated by arrow 506. Or, the driver may speak into a blue tooth headset 508 so that those commands are transmitted wirelessly as indicated by arrow 510. In some embodiments, by way of communication 506 or 508 the driver 504 may control an entertainment center 512, as indicated by arrows 514 and 516. Other devices, for example a cell phone or other communication system such as on-star or satellite radio service, such as one bringing traffic alert information, may also be controlled or made use of. These communications devices may work with the device 500 as disclosed in U.S. patent application Ser. No. 12/389,978 filed Feb. 20, 2009 and U.S. patent application Ser. No. 12/578,377, both of which are hereby incorporated by reference herein. The driver and device 500 may also send commands and communicate with the detector 502 as indicated by arrows 518 and 520. An example of a command to the detector would be a command that mutes an alert. Or, the detector could send an alert to the driver through the blue tooth headset, as additionally described in U.S. patent application Ser. No. 12/389,978 filed Feb. 20, 2009 and previously incorporated by reference herein in its entirety.

The preceding described hardware. Now various embodiments of screen-shots of display 26 will be used to further describe use of the device.

Figure 12:
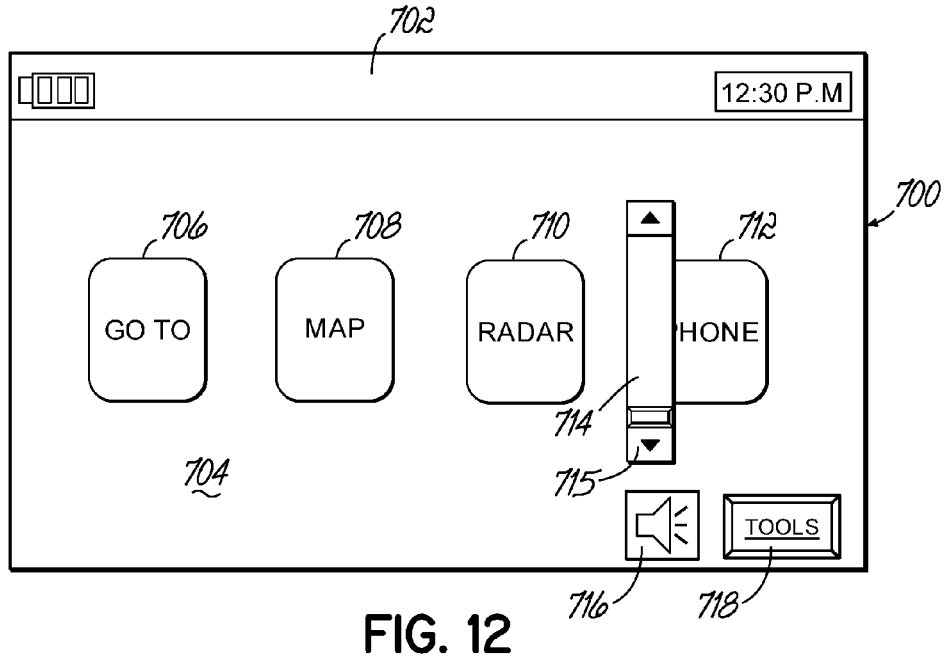
FIG. 12 illustrates an options menu on the display of the embodiment of FIG. 2.

FIG. 12 is an options menu 700, with a status Icon area 702 along the top that may have icons that, for example, include GPS, battery status, a compass, etc. The main view area 704 has four options as follows: A Go To 706 brings up a Go To screen (not shown) to find or input a destination such as, for example, an address, a point of interest, or one's home. Through the Go To screen there is access to a favorites list and a QWERTY or other style keyboard. From the GO TO screen, there is access to begin navigation. A Map option 708 brings up the map screen which will be described further with reference to FIG. 14. A Radar option 710 accesses a detector features menu that is shown and further described with reference to FIGS. 18 and 19. A Phone option 712 allows setting up and accessing optional phone interface capabilities. Across the Phone selection a scroll type volume control 714 having a slider 715 is shown, that is temporarily active on the screen because the volume button 716 has been touched.

Figure 13:
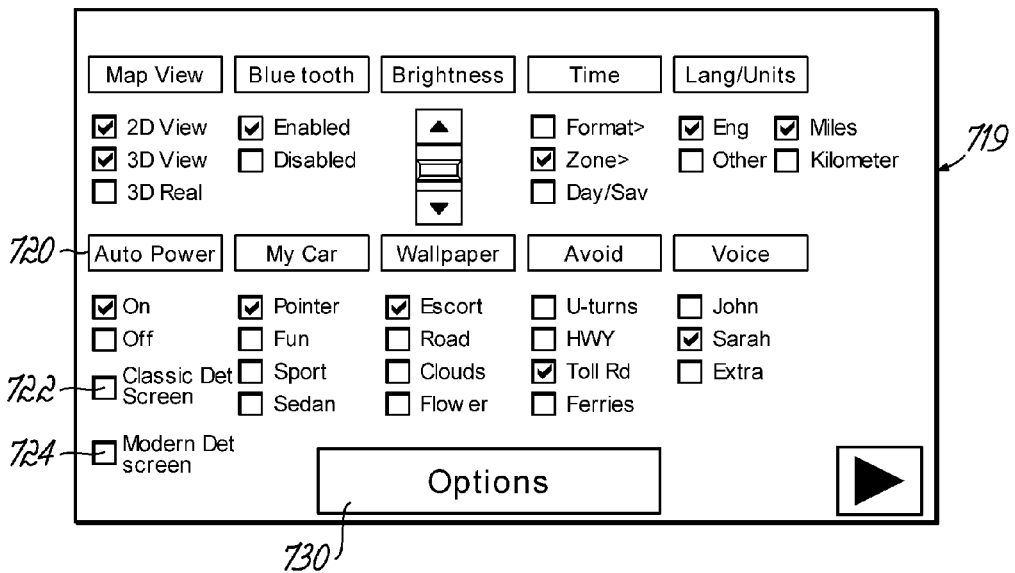
FIGS. 13 and 14 illustrate a tools menu accessed from a tool button on the options menu of FIG. 12.
Figure 14:
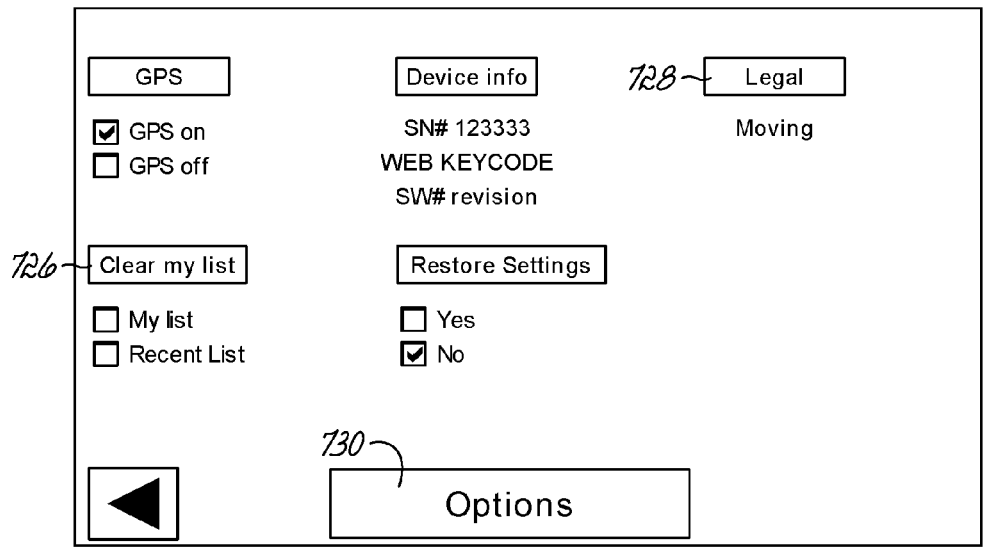

The Tools selection 718 brings up the tool screens 719 as illustrated in FIGS. 13 and 14, having many menu categories with check box and/or scroll type controls for setting parameters, many of which one of ordinary skill in the art will recognize as common to many other navigational and phone units for use in moving vehicles. Those will not be further explained here. However, three categories are in need of further description. In FIG. 13, the Auto Power category 720 allows for choosing whether or not the detector should become active when the car is turned on, and whether it should do so with a "Classic Detector Screen" 722 that does not show navigation type information, or a "Modern Detector Screen" 724 that does. Clear My List 726 allows for removal of previously stored or displayed information. Legal 728 provides access to view legal and safety agreements. The arrow keys in the bottom corners of the screen switch between the screen of FIGS. 13 and 14. The Options selection 730 returns the display to Options Screen FIG. 12.

Figure 15:
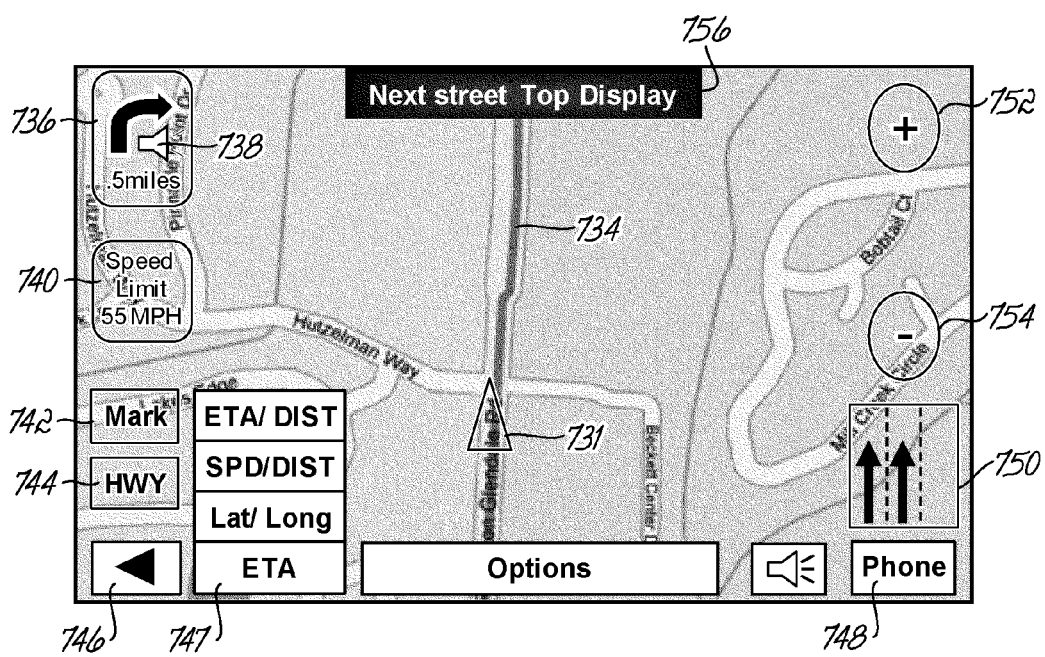
FIGS. 15, 16, 17 illustrate several conditions of the navigation screen on the display of the embodiment of FIG. 2.

FIG. 15 is an example of one screen during navigation with the detector on and nothing detected. An arrow or other icon 731 represents the current location and travel direction of the device 10, along a bold line 734 that is the currently planned route. Starting from the top left in the figure, and proceeding counter clockwise, a turn icon 736 with voice replay 738 informs the driver of an upcoming turn, and a touch replays the audio associated with that turn. A current speed limit icon 740 conveys posted speed limits at the present location as listed in available data resources. A mark icon 742 will be further explained with reference to FIGS. 16 and 17. The highway Icon 744 is a toggle that can be set at HWY, CITY, or AUTO, to control options such as the level of detail to annunciate and collect. It may also be used to set sensitivity to one of three levels: Highway—Provides maximum sensitivity on all bands, Auto—Provides real-time sensitivity adjustment based on your vehicle speed, as is described in U.S. Pat. No. 7,397,416, which is hereby incorporated by reference. In Auto, as vehicle speed increases, the radar sensitivity (X- and K-band) is set to maximum range. As the vehicle speed decreases, the radar sensitivity (X- and K-band only) is minimized to reduce unwanted false alarms. Full sensitivity is maintained on all other bands. A setting "Auto No X"—Provides the same detection sensitivity as Auto mode, with X-band turned off.

The arrow key 746 in the lower left navigates to other screens. The ETA (Estimated Time of Arrival) icon 747, shown in its expanded form after having been recently touched, changes the ETA reporting among the choices of ETA/Distance, Speed/Distance, or Latitude/Longitude. The options icon and volume icon have been previously described. The phone 748 icon brings up quick access to phone features. A lane assists 750 displays, when data is available, lane options such as for example straight or right turn only. This icon is one of the features present on the navigation screens, but not on the Map screens accessed by the map option of FIG. 7. Plus 752 and minus 754 icons zoom in and out. The Next Street Icon 756 toggles, via a drop down menu, between Next Street Top, Next Street Bottom, Current Street Top, and Current Street Bottom so that a person can read the names of the streets at a location of their choosing on the screen.

Figure 16:
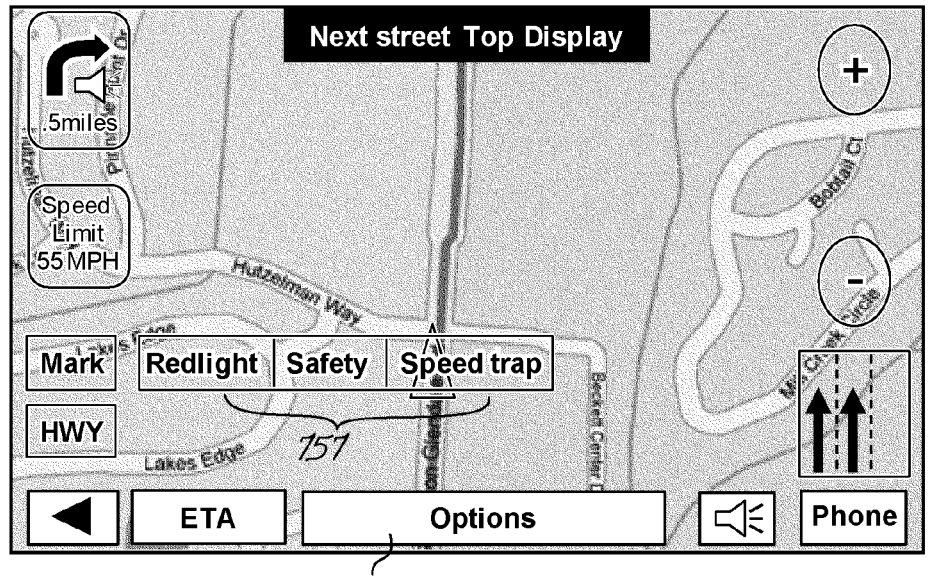

FIG. 16 shows at 757 the options that the mark button has when there is no detector alert. These may be used to input data, either while driving or at home or a similar place, to manually input data such as for example traffic signals, safety concerns, or speed traps. These choices, as well as other icons previously mentioned, are shown partially transparent so that they do not obscure the navigational information on the screen.

Figure 17:
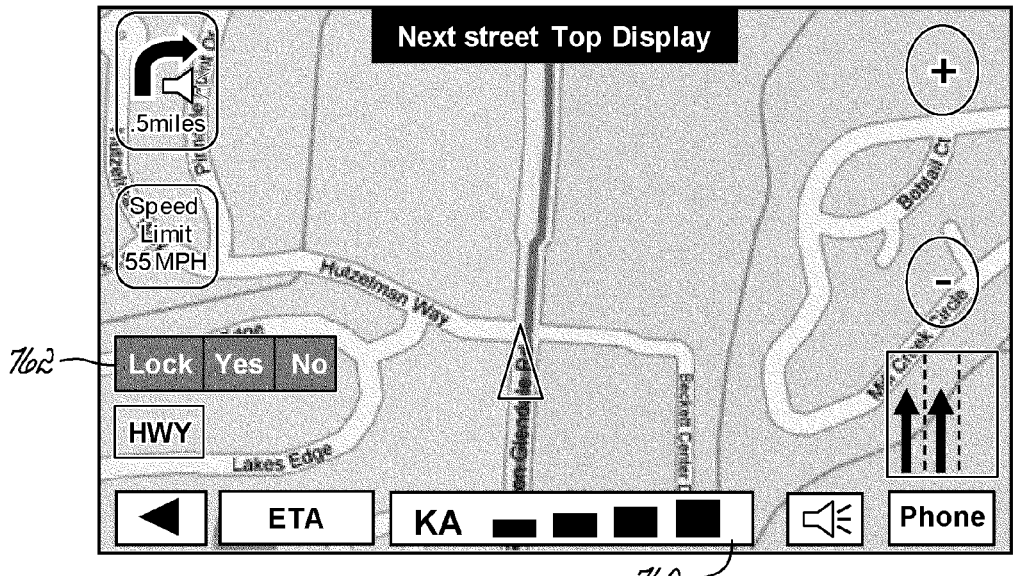

FIG. 17 illustrates the screen with an alert. The option Icon 758 changes to an alert icon 760 that displays the type of signal causing the alert (in this example, KA band radar) and a representation of signal strength. If so programmed in the options menu, an audible signal is also generated. At the moment of alert, the previous mark icon changed to a lock icon 762. As shown in FIG. 17, a person has touched the lock icon to display two choices, yes or no. Yes will program into memory that this type of signal at this location should be locked, i.e., prevented from alerting in the future. Or no, do not put the alert into memory. Selecting "no" is like cancel, and is the same as not having pushed the lock button at all. During an alert, touching any part of the screen that is not a button will mute the current audible signal.

Figure 18:
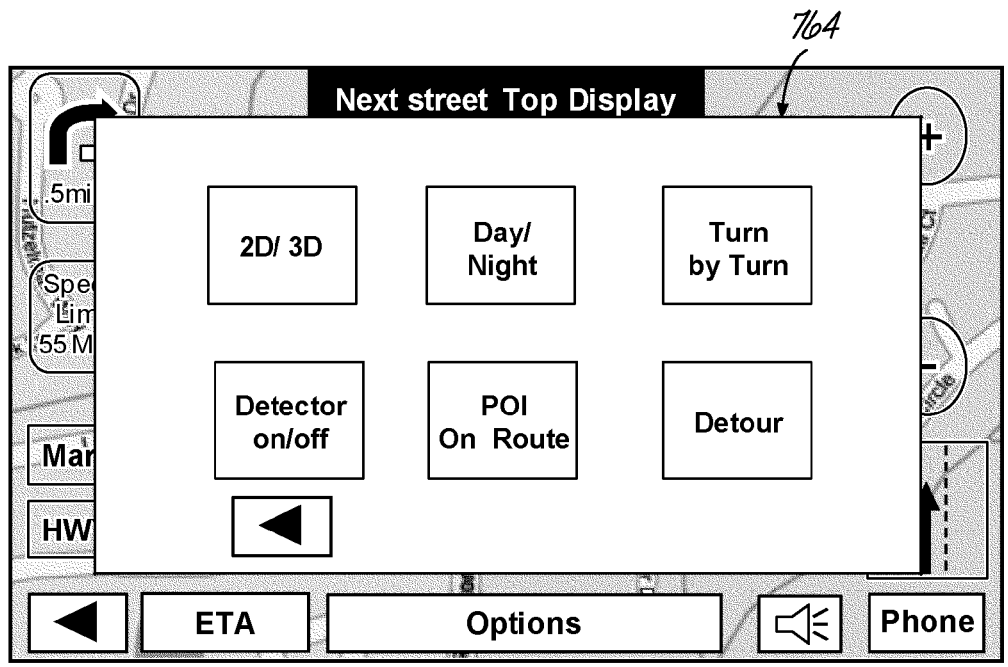
FIG. 18 illustrates a Fast Feature screen accessible from the navigation screens of FIGS. 15-17.

FIG. 18 illustrates a fast feature 764 menu that is accessed by pressing anywhere on the Navigation screen that is not a button. The fast feature is context sensitive, and looks different depending upon what screens and actions are occurring when the fast feature screen is accessed. Some of these buttons access features that are accessible through other screens, but some may be unique.

Figure 19:
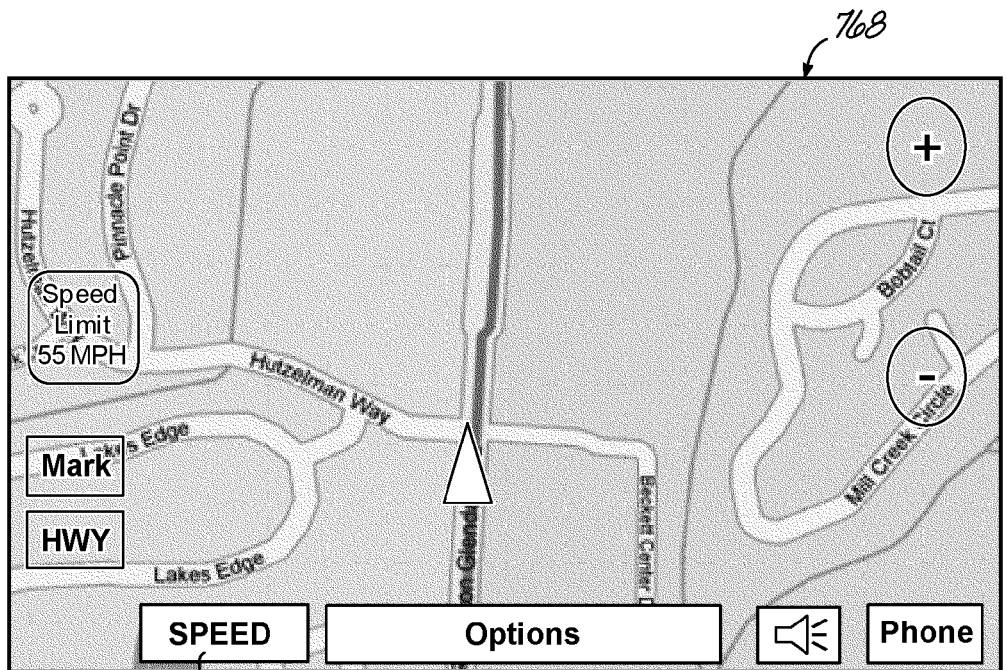
FIG. 19 illustrates a Map screen accessed from the Map button on the options menu of FIG. 12.

FIG. 19 illustrates a Map screen 768. The Map screen is similar looking to a navigation screen, and it displays, marks, and locks alerts and other features of the environment as previously described.

Figure 20:
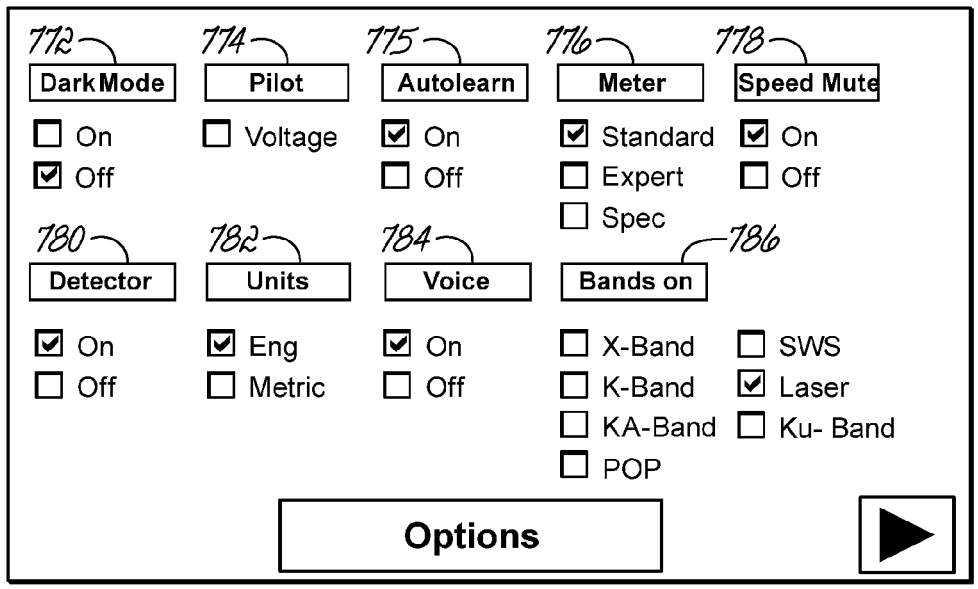
FIGS. 20 and 21 illustrate a detector menu accessed from the radar button on the options menu of FIG. 12.
Figure 21:
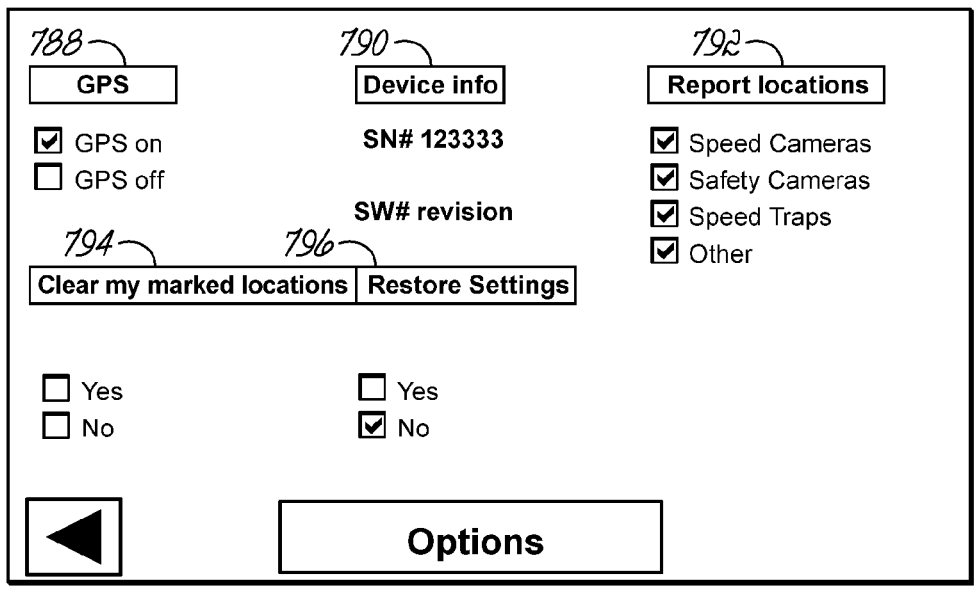

FIGS. 20, 21 are a two screen menu with detector selections accessed by pressing the radar option (FIG. 12). As can be seen, there are 14 categories. This is just one of many ways that the information could be displayed. None the less, these 14 categories provide an organized approach to describing additional features of the device 10.

In FIG. 20, Dark mode 772 refers to the ability of the screen to sense dark ambient conditions, and adjust screen colors to different settings that are easier to see in the dark. Pilot 774 refers to the vehicle status information that can be displayed during normal operation, such as the battery voltage, or vehicle speed. Autolearn 775 is the ability of the detector to analyze (over time) the repetitiveness of radar signals by location and frequency. This allows the device to determine if a signal at a given location is a real threat or a false one. If, for example, the signal is repeated at a location over multiple encounters, it is likely an automatic door opener, motion sensor, etc., which can be automatically locked at the particular location. Acknowledgement, for example a "stored" message accompanied by a single beep, may be used when a signal has been automatically locked out. AutoLearn may, for example, require the exact frequency in the same location approximately three times to lock it out. When AutoLearn may also un-learn signals to protect the user from locking out real threats. If a particular signal is no longer present at a location that was previously locked out, the device may unlock that signal.

Meter 776 allows a person to set how they would like signals to be displayed, for example as a bar graph, or numerical frequency information for the experienced user.

Speed mute 778 will keep alerts from audibly sounding when the device 10 calculates that the vehicle is moving slower than the posted speed limit.

Detector 780 works with the auto power feature of FIG. 8 to set whether the detector comes on during Auto Power.

Units 782 controls whether the display is English units or Metric.

Voice 784 determines whether voice commands are used in addition to visual commands. Whether the voice is a male or female voice is selected in FIG. 13 on the tools menu.

Bands on 786 provide a place to designate which of the various bands that the detector is capable of detecting, should be alerted. Choosing to not particular bands can reduce the number of false alerts.

In FIG. 21, GPS 788 allows the unit to have GPS turned off and then work only as an older style detector, and without any navigational function.

Device info 790 is for identification purposes. Report locations 792 designate which of the listed items, known to the device's data base, should be alerted.

Clear my marked locations 794 and restore settings 796, are two categories that are intended to be rarely used. They may be used, for example, when a person moves from one city to another, or when the device is given to a different person who wishes to begin accumulating fresh experiential data.

Although this application shows only images on the screen of the device 10, one should understand that with a USB, WiFi, or similar connection, the menus may also be shown on a personal computer, and other options added.

Figure 22A:
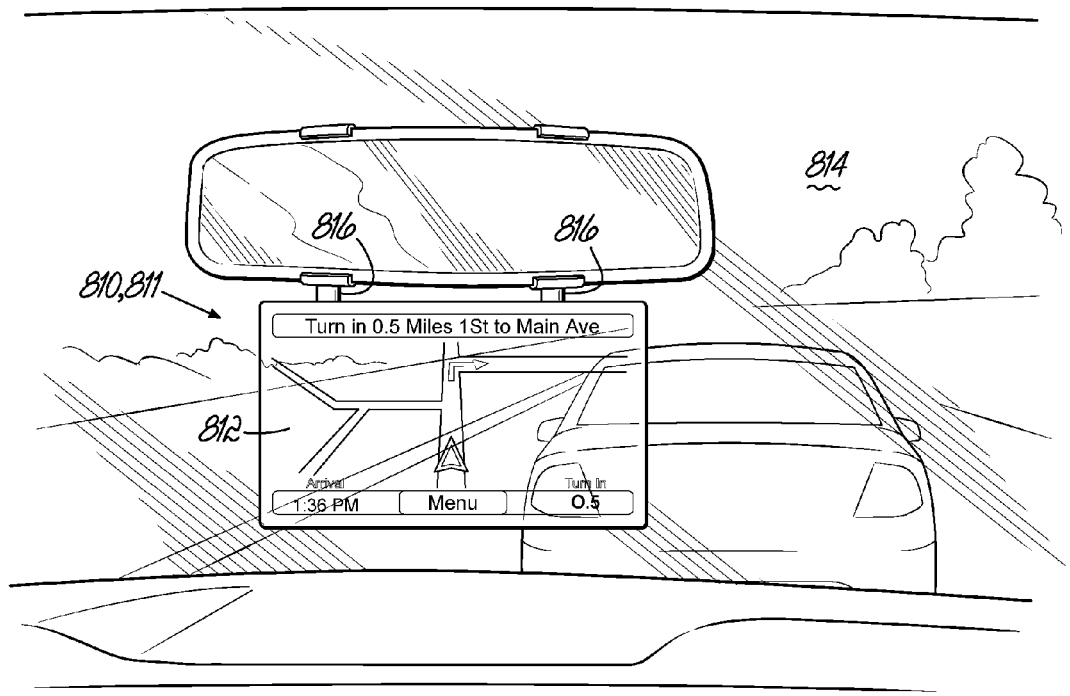
Figure 23:
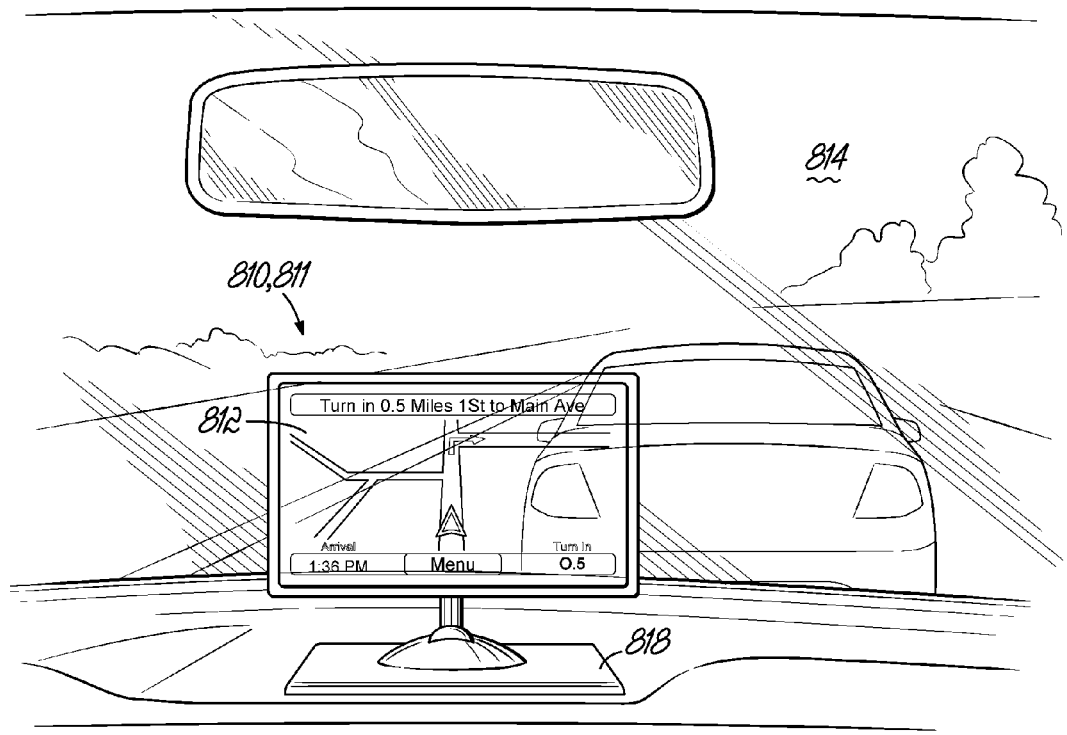
FIG. 23 illustrates an embodiment of a detector, similar to FIG. 22, can be at least partially seen through, but is mounted on a pedestal.

FIGS. 22, 22A, and 23 illustrate a navigation device 810, or navigation and radar detector device 811, that uses a screen 812 which allows improved visual awareness of the surroundings 814 outside the vehicle. The screen is at least partially transparent. In the illustrated embodiment 810, 811, the electronics and antennae are remotely located and the display information is transmitted to the display wirelessly, or through a wire harness (not shown). The screen 812 may be, for example, an OLED Active Matrix LCD touch display that is also see-through, as for example in the Samsung media player known as the IceTouch. OLED technology is disclosed, for example, in U.S. Pat. No. 7,583,343, which is incorporated by reference herein in its entirety. It is contemplated that brackets 816 may be articulated so that when the car is parked the screen 812 can be raised to a position aligned with the mirror, making it less visible and a target of theft. In FIG. 23, the device 810, 811 is on a pedestal mount 818.

It will be appreciated that a device of the type shown in FIGS. 22 and 22A provides the benefits of a mirror-mounted display panel while allowing the vehicle to retain its original factory mirror, which is particularly useful where the original mirror contains OEM electronic components such as a hands-free microphone or communication system such as the GM ONSTAR system.

FIGS. 24-35 illustrate an additional particular embodiment of the screens that may be used by a detector with navigation function. The device 910 shown in these figures has an outward appearances similar to that of device 10 discussed above (FIG. 2, for example) and for brevity, are not illustrated again. Instead, the figures illustrate images displayed when the device is in use. As one of ordinary skill in the art would understand, these images are examples only, and may be modified or rearranged and remain within the bounds of the present invention.

A main menu 912 has a battery strength indicator 914, a GPS satellite availability indicator 916, and seven touch-screen icons comprising Detector 918, Map 920, Go to . . . 922, Volume 924, Stop 926, Routes 928, and Settings 930.

Touching the GPS availability indicator 916 displays the current longitude and latitude of the device, if GPS signals are being received. If the signals are not currently received, the indicator will have a red-line through it and the current location is not available.

Figure 26:
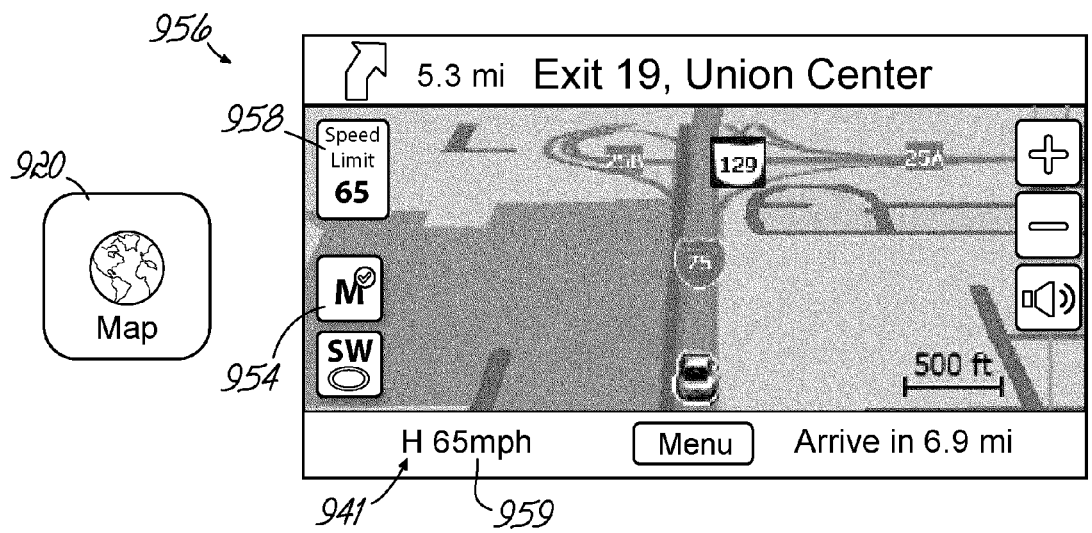
FIGS. 26-29 are schematic views of map screens in the embodiment of FIG. 24.
Figure 25A:
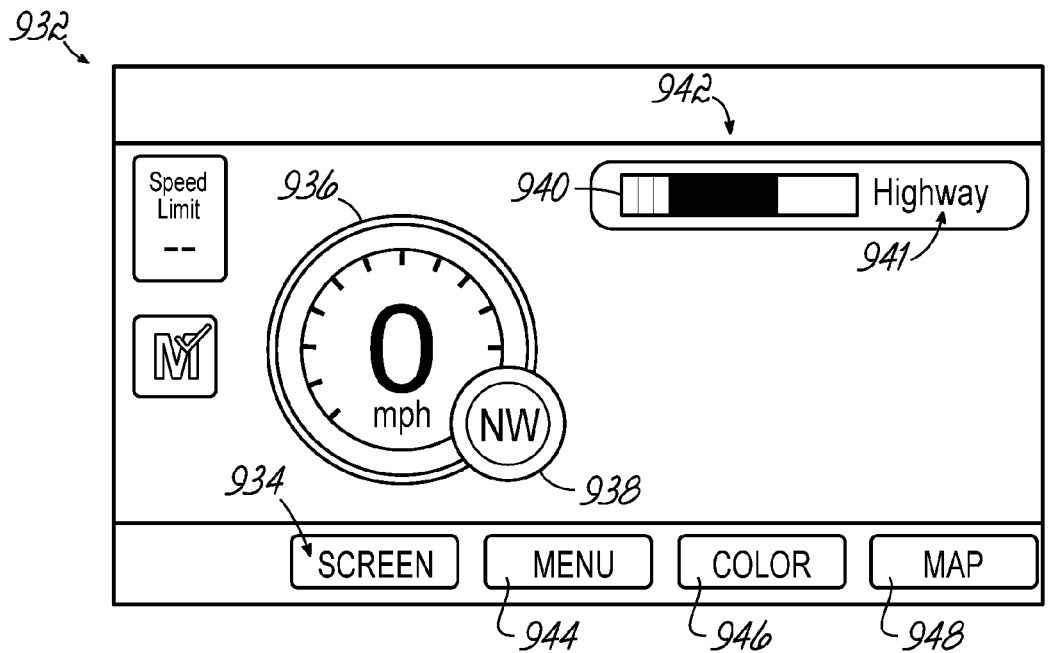
FIGS. 25A-25D are schematic views of detector screens in the embodiment of FIG. 24.
Figure 25B:
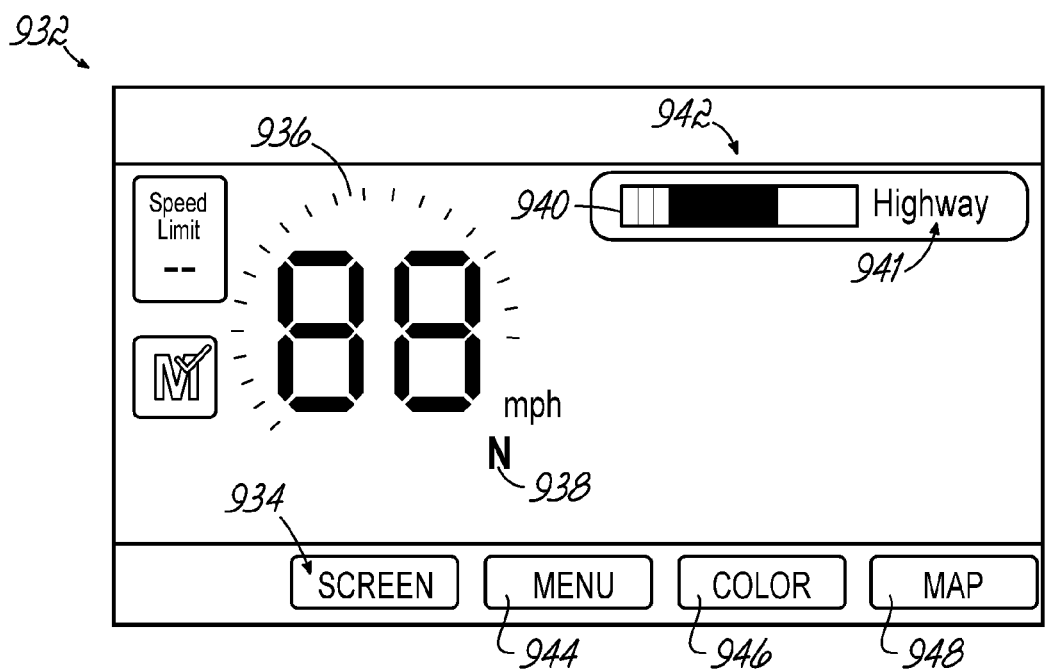

Selecting Detector 918 brings up the detector screen 932, FIGS. 25A-25D. The detector screen 932 may take on at least two different appearances, depending on viewer preference. This is referred to by some as "skinning", meaning that the appearance of underlying data may be presented graphically in more than one manner. A screen button 934 switches among the different appearances. FIG. 25A has a depiction of an analog speedometer 936 and a compass heading 938 displaying NW, for northwest. A radar signal strength meter 940 and the sensitivity mode 941 is displayed in a primary alert area 942. Along the bottom is a menu button 944 for returning to the main menu 912, a color button 946 to change appearances of the detector screen 932, and a map button 948 to move directly to a map screen 956 (FIG. 26). FIG. 25B illustrates an example of the detector screen 932 displayed using a "skin" with a digital speedometer appearance. Which skin and colors to use is dependent on user preference.

The sensitivity mode 941 has, for example three detection sensitivity modes, as well as an option to turn radar/laser detection off. One can select any of these options by touching the On-Screen Radar/Laser Alert Area when the unit is not receiving an alert. The area will display Highway, Auto, or Auto No X (the functions of which are discussed above), and device 910 will provide a voice confirmation of the selection.

Figure 25C:
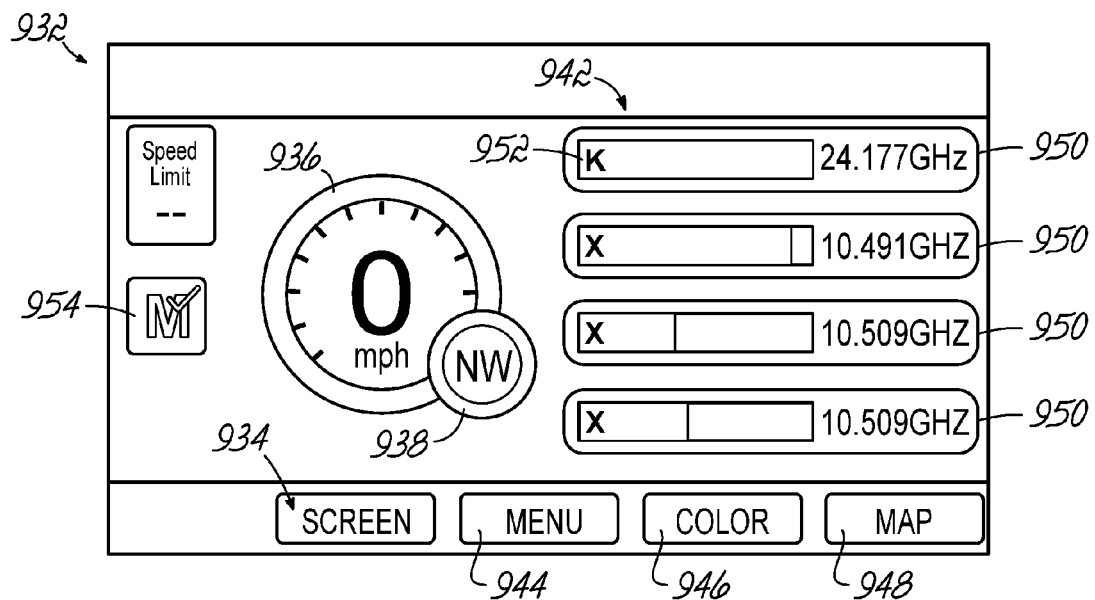
Figure 25D:
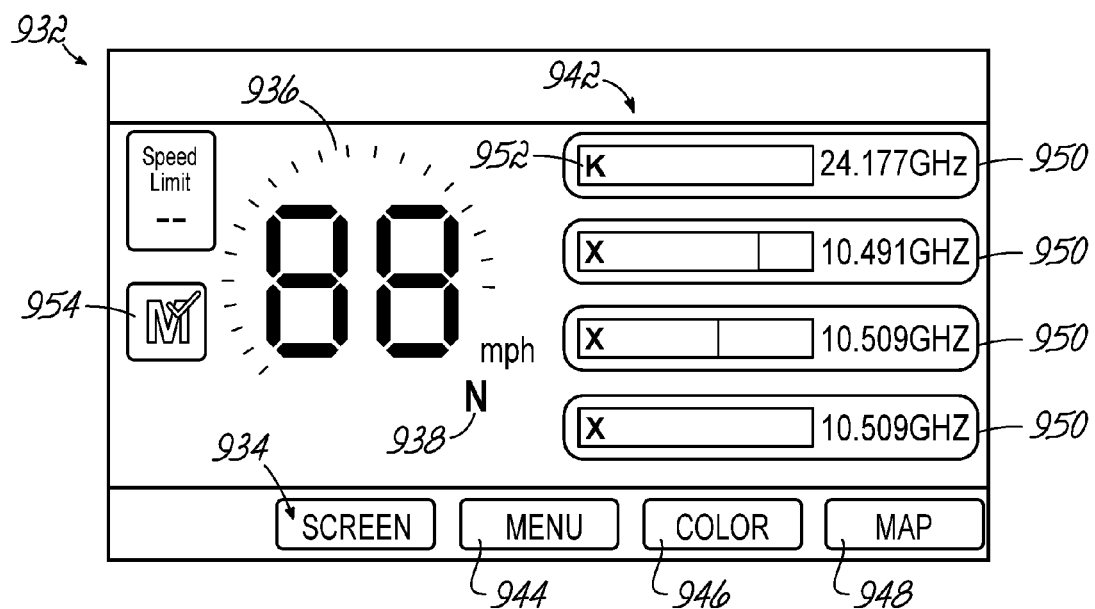

FIGS. 25C and 25D illustrate detector screen 932 of FIGS. 25A and 25B respectively, with the signal strength meter 940 hidden, and up to four different radar alerts 950 displayed. The most severe alert 952 is displayed in the primary alert area 942 and the other alerts 950 are below the primary alert area 942. Next to each of the alerts 950 and 952 is the actual frequency, in GHZ, of the respective signal. A mark button 954 allows the user to mark radar or safety camera locations for future warnings, as will be explained in greater detail with reference to later figures.

Figure 27:
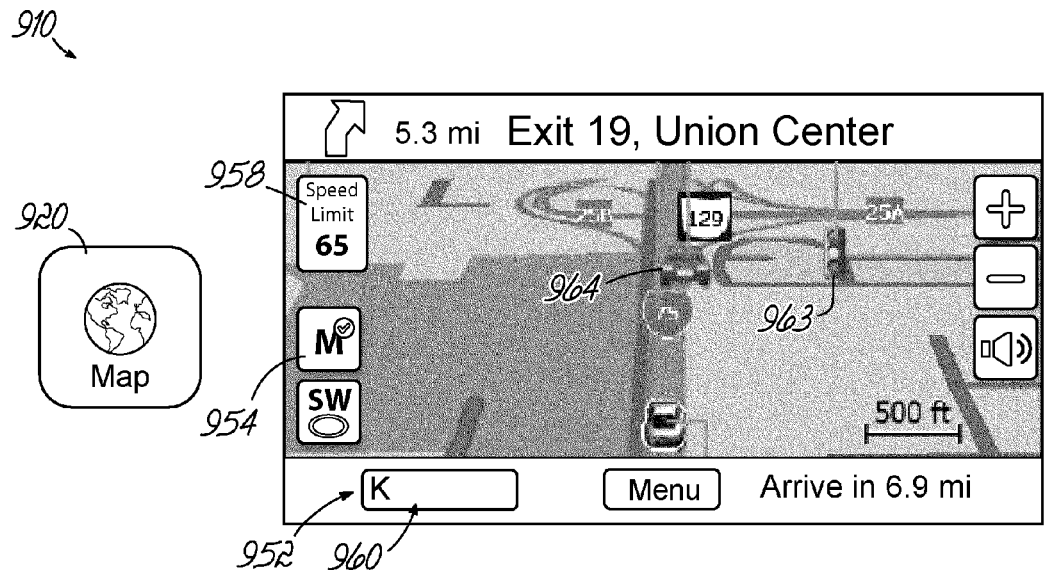
Figure 28:
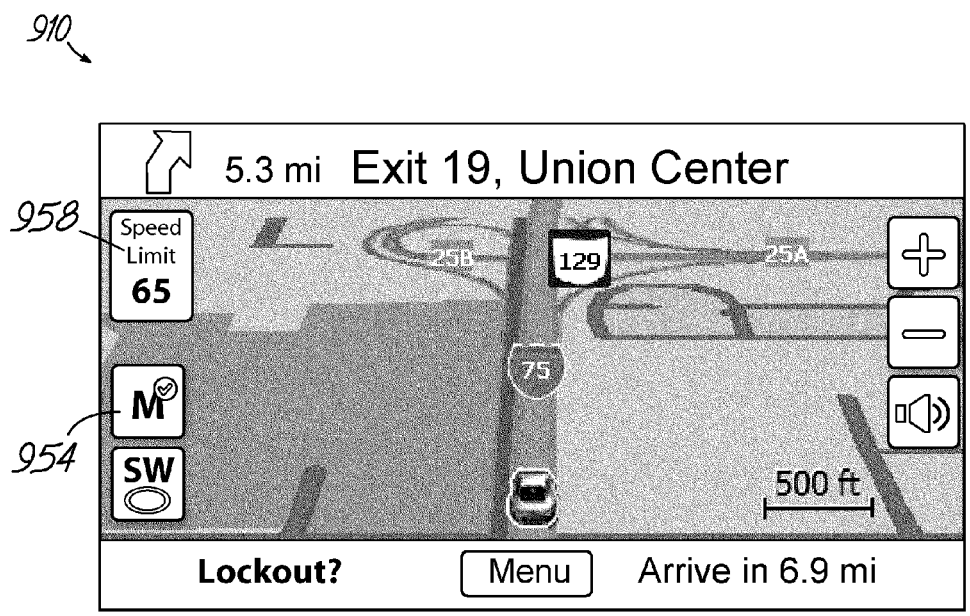
Figure 29:
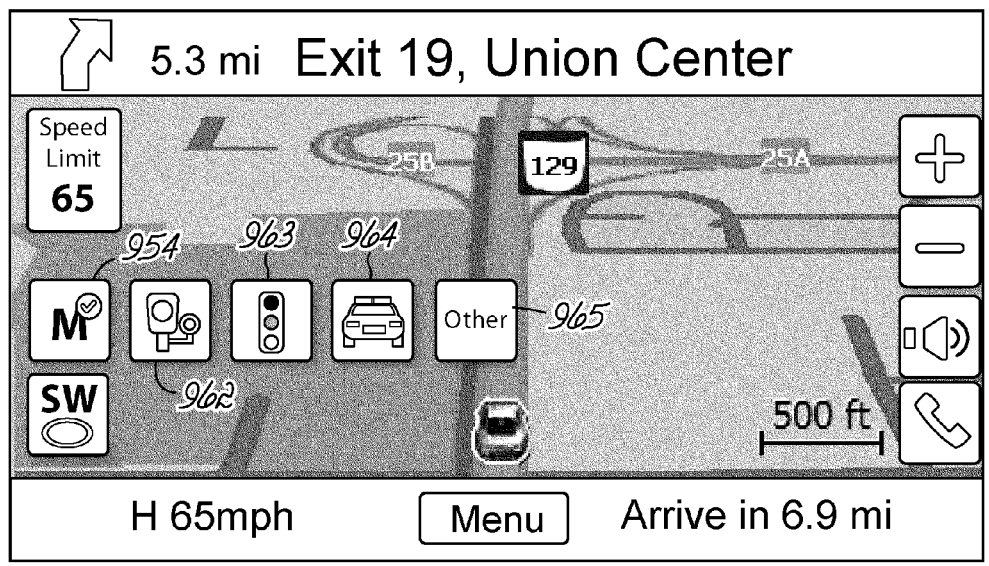

FIGS. 26-29 illustrate a map screen 956 similar to those found on many navigation devices. Screen 956 has an indication of the speed limit 958 at the current location, actual speed 959, sensitivity setting 941, and mark button 954. In FIG. 27, the alert 952 of K band radar is displayed in the radar/laser alert area 960. Touching this alert once would mute it, touching it a second time would prompt "Lockout?" (FIG. 28) and touching it a third time will confirm to lock this signal out by location and frequency. A "stored" message (not shown) will be displayed. Once a signal has been stored, the device 910 will reject the signal the next time the area is approached—and will display the locked-out alert in the On-Screen Radar/Laser Alert Area with either a gray bar (Standard Bar Graph mode) or white text (SpecDisplay mode). To unlock a signal that has already been stored, simply press and hold the SmartCord mute button or touch the On-Screen Radar/Laser Alert Area while receiving the locked out "alert." The display will read "Unlock?", and a mute button on the power cord (not shown) or a touch are on the On-Screen Radar/Laser Alert Area can be used to unlock it from memory. The display will then read "Unlocked" to confirm the action.

The mark icon 954 allows the user to mark a specific location, usually something visually identified as a threat, and label it for future reference. Once marked, device 910 will provide an audible and visual on-screen alert when the device again reaches this area. Advance warning will occur, for example, at the following distances: Red-light cameras: 250 ft. or 10 seconds, Speed cameras: 500 ft. when traveling below 55 mph; 1,000 ft. when traveling above 55 mph, Speed traps: 0.3 ml. or approximately 1,584 ft., Other: 500 ft. when traveling below 55 mph; 1,000 ft. when traveling above 55 mph. A location is marked by touching the mark icon 954 and the display will show the following icons (FIG. 29) displayed next to the mark button 954: speed camera 962, red-light camera 963, speed trap 964, and other 965. The corresponding icon is used to confirm the type of location being marked. The selected marker will appear in the location along the route.

FIG. 27 is an example of a red light camera 963 and a speed trap 964 being displayed as a result of a previously marked encounter. When a location is marked the first time the device must travel, for example at least 1 mile, away from that location to receive an alert. To unmark a location, the mark icon 954 is touched during a "marked location" alert. The display will read "Unmark?" in the Radar/Laser Alert Area. Touching the mark icon 954 again will confirm.

Figure 30:
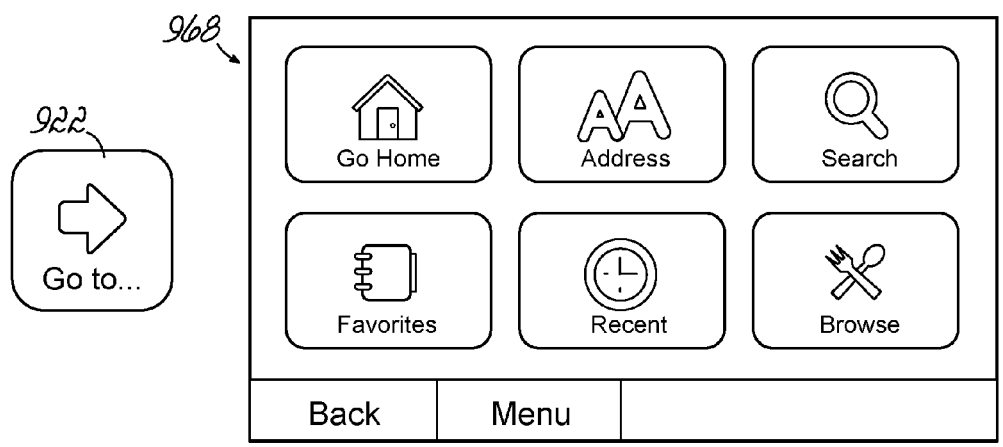
FIG. 30 is a schematic view of a Go-To screen in the embodiment of FIG. 24.

FIG. 30 illustrates a Go To screen reached by Go to . . . button 922. The six icon buttons, with their descriptors, are self explanatory and would be understood by one of ordinary skill in the art of making or using navigation devices. Generally, screen 968 sets up a route to an address, or to a restaurant, gas station, park, hospital, or other common public locale. The device may store a home address, to allow a quick calculation of a route to go home from any other location. A particular point of interest may be located from an internal database by name using the Search function, or they may be browse by category in Browse. Favorites is used to store locations to which the vehicle frequently navigates. Recent allows navigation to the most recent destinations without having to enter them again.

Figure 24:
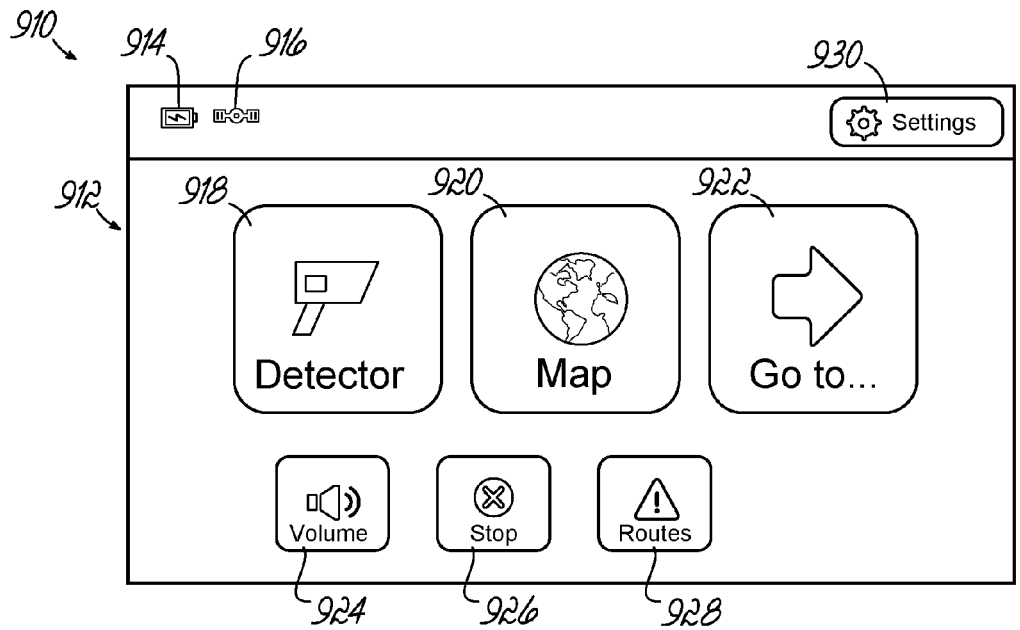
FIG. 24 is a schematic view of a main menu of a sixth embodiment of a navigation and police activity warning device main menu.
Figure 31:
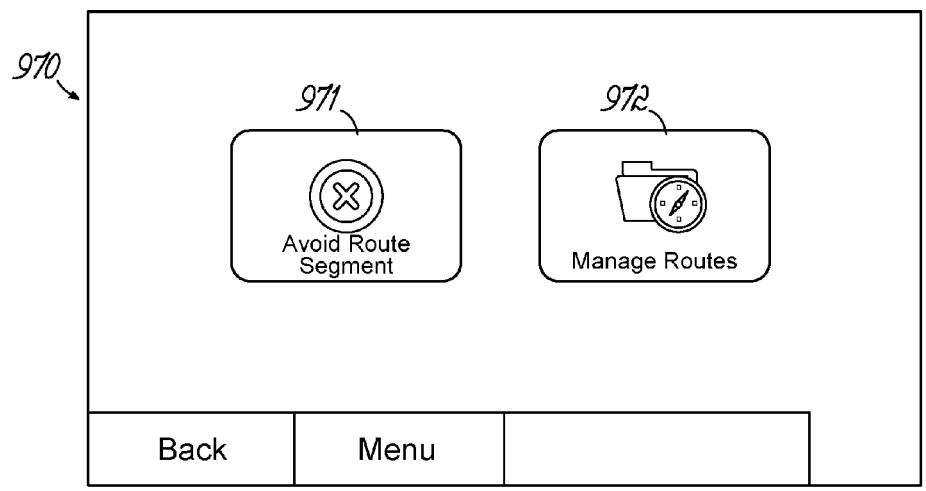
FIG. 31 is a schematic view of a manage-route screen in the embodiment of FIG. 24.
Figure 32:
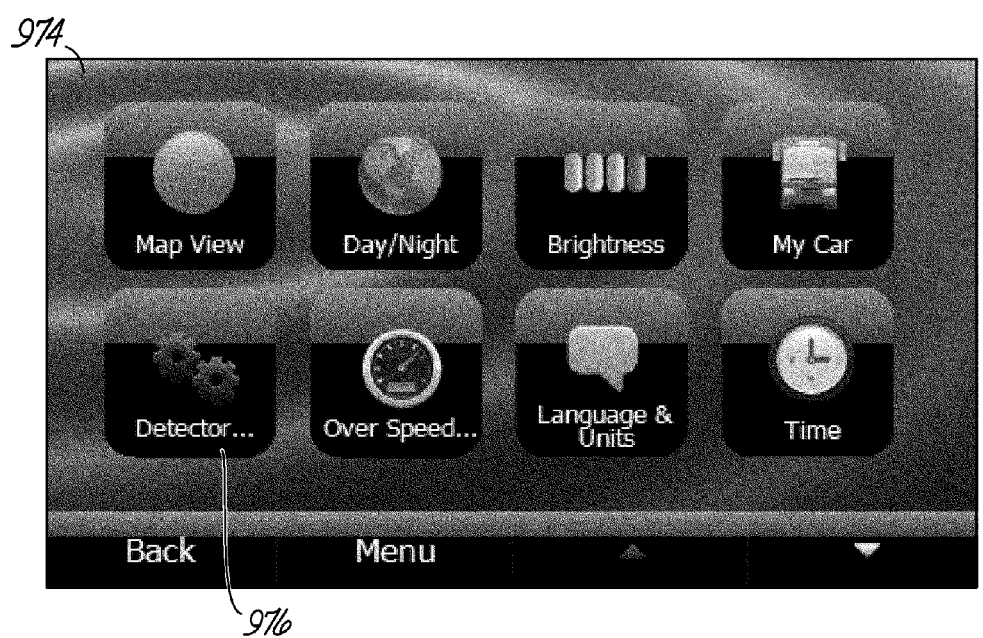
FIGS. 32-34 are schematic views of general setting screens in the embodiment of FIG. 24.
Figure 33:
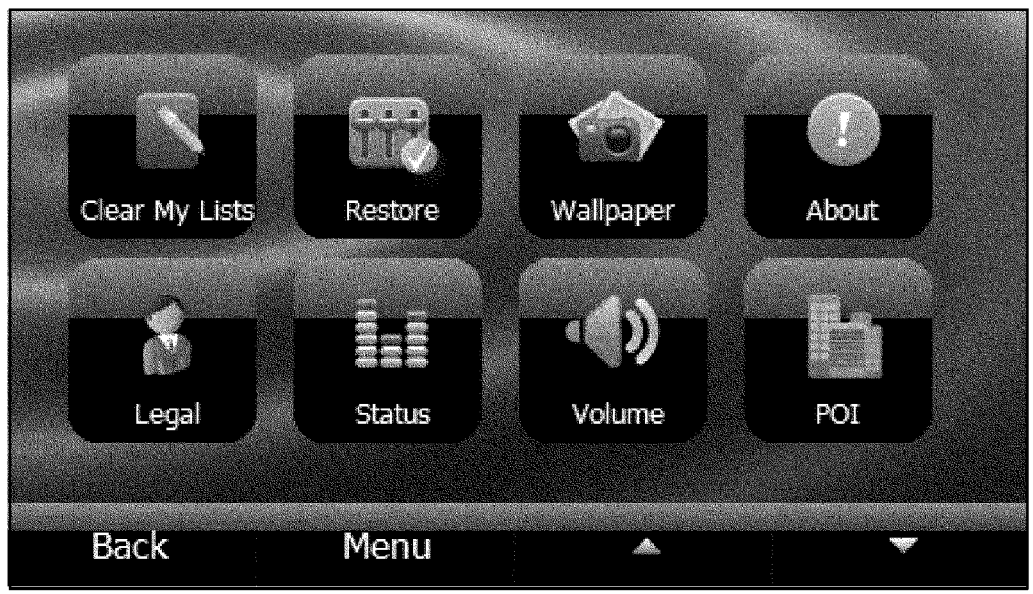
Figure 34:
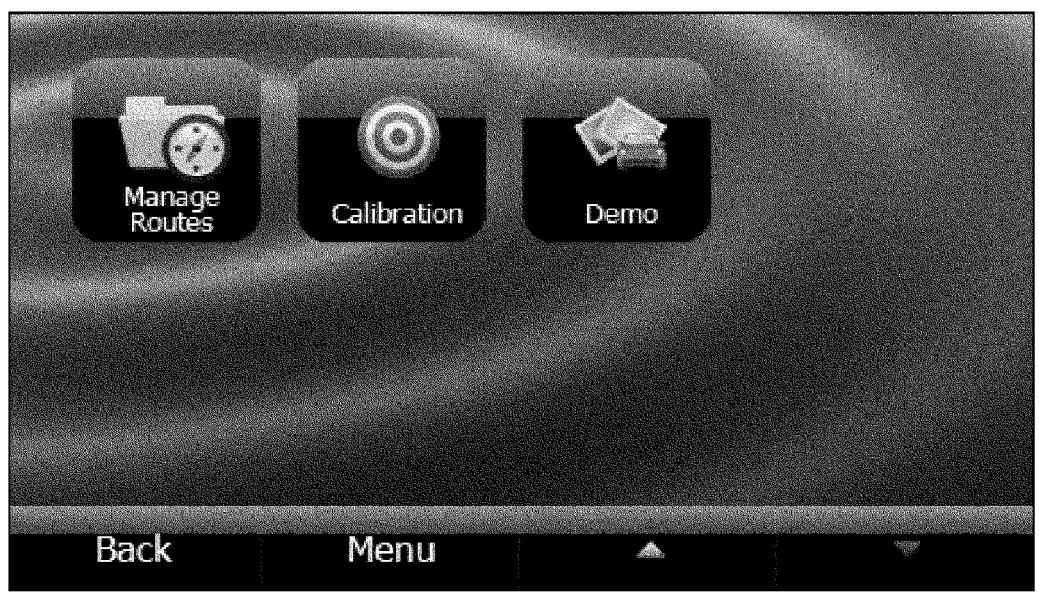
Figure 35:
FIGS. 35-36 are schematic views of detector setting screens in the embodiment of FIG. 24.

FIG. 31 illustrates a Routes Screen 970, reached for example, by Routes button 925 of the main menu (FIG. 24). Its purpose, and general function is as follows: If there is an upcoming traffic slow-down or incident along a route, the user may choose to avoid the affected portion of the route. An alternate route is generated from the Menu function on the Map View 956; in the Main Menu screen, Routes 925 brings up a menu including Avoid Route Segment 971 which may be used to display the planned route, and then touch the portion of the route (street name) to avoid. If possible, device 910 will calculate a new route avoiding that roadway. The Detour button displays in the top right corner of the screen to begin following the alternate route.

FIG. 31 also has a Manage Routes button 972. This button permits the user to create and save routes regularly traveled. From Map View 956, Menu at the bottom of the screen, followed by Routes 928 (FIG. 24) and Manage Routes 972 brings up a Manage Routes screen (not shown) where a route may be created, selecting the origin from either the current location, recent destinations, or a saved favorite destination, and a destination may be chosen from the same candidates. The route is then named and stored.

Figure 36:

With further reference to main menu screen 912 of FIG. 24, the Stop button 926 is used to cancel a route. The volume button 924 is used to adjust the volume of voice prompts. The setting button 930 leads to many settings and preferences submenus, illustrated as a screen 974 that spreads over three displays in FIGS. 32-33. These three displays are navigated with the up and down arrows (not numbered). Preferences and settings are generally in three categories. 1. GPS Navigation settings. 2. Detector: settings that are accessed by button 976 leading to the screens depicted in FIGS. 35 and 36, and 3. General settings: Settings of the type that have been discussed earlier.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A navigation and police activity warning device comprising:
   a receiver section receiving signals in a signal band used in the context of law enforcement activity;
   a warning section responding to the receiver section and capable of providing an audible warning of a received signal;
   a position determining circuit;
   a touch-sensitive display screen;
   a processor receiving having a memory storing position-related information and controlling the warning section and the touch-sensitive display screen to cause display of receiver information on the status of the receiver section and position information from the memory relating to a position identified by the position determining circuit, the processor causing the touch-sensitive display screen to selectively and simultaneously display both the receiver and position information in at least two different arrangements.

2. The device of claim 1 further comprising a radar reflector for reflecting radar signals in a signal band used in the context of law enforcement activity to said receiver section.

3. The device of claim 2 wherein the radar reflector is parabolic.

4. The device of claim 1 further comprising an antenna horn having a long axis mounted parallel to a plane of the display screen.

5. The device of claim 4 further comprising a reflector for receiving radar signals from in front of the vehicle and reflecting them to said antenna.

6. The device of claim 5 wherein the reflector is parabolic.

7. The device of claim 4 wherein said antenna horn is positioned behind a display surface of said display screen.

8. The device of claim 1 wherein the processor controls the touch-sensitive display screen to present a touch screen button that, when touched, causes the processor to select one of the at least two arrangements in which receiver and position information is simultaneously displayed on the touch screen display.

9. A navigation and police activity warning device comprising:
   a passenger cockpit mounted housing;
   a receiver section within the housing receiving signals in a signal band used in the context of law enforcement activity;
   a warning section within the housing responding to the receiver section and providing a warning of a received signal, the warning being generated, suppressed or modified at least in part in response to a vehicle location derived from a position determining circuit;

a display screen within the housing; and a radar reflector within the housing for reflecting radar signals in a signal band used in the context of law enforcement activity to said receiver section.

10. The device of claim 9 wherein the radar reflector is parabolic.

11. The device of claim 9 further comprising an antenna horn having a long axis mounted parallel to a plane of the display screen.

12. The device of claim 11 wherein said antenna horn is positioned behind a display surface of said display screen.

13. The device of claim 9 wherein the display screen is a touch-sensitive display screen.

14. The device of claim 13 wherein the touch-sensitive display screen presents a touch screen button that, when touched, permits the selection of one of at least two arrangements in which information is displayed on the touch screen display.

15. A radar detection device for attachment to a ground vehicle comprising:

a transparent display screen allowing viewing of the vehicle surrounding through the display screen, a receiver section within a housing receiving signals in a signal band used in the context of law enforcement activity;

a warning section within the housing responding to the receiver section and providing a warning of a received signal;

a mounting for mounting said display screen adjacent to a windshield of the vehicle.

16. The display screen of claim 15 wherein the screen is an OLED LCD display.

17. The device of claim 15 wherein said display is a touch-sensitive display.

18. The device of claim 15 wherein the mounting mounts to a dashboard of the vehicle.

19. The device of claim 15 wherein the mounting mounts to a rearview mirror of the vehicle.

* * * * *